United States Patent
Vantrease et al.

(10) Patent No.: US 11,275,997 B1
(45) Date of Patent: Mar. 15, 2022

(54) WEIGHT LOADING IN AN ARRAY

(71) Applicant: Amazon Technologies, Inc., Seattle, WA (US)

(72) Inventors: Dana Michelle Vantrease, Austin, TX (US); Ron Diamant, Albany, CA (US); Sundeep Amirineni, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 981 days.

(21) Appl. No.: 15/967,318

(22) Filed: Apr. 30, 2018

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
USPC .......................................................... 706/25
See application file for complete search history.

(56) References Cited

U.S. PATENT DOCUMENTS

2018/0336164 A1\* 11/2018 Phelps ................ G06F 9/30036
2019/0251432 A1\* 8/2019 Motomura ............ G06F 7/5443

\* cited by examiner

*Primary Examiner* — Lut Wong
(74) *Attorney, Agent, or Firm* — Kilpatrick Townsend & Stockton LLP

(57) ABSTRACT

Disclosed herein are techniques for obtain weights for neural network computations. In one embodiment, an integrated circuit may include memory configured to store a first weight and a second weight; a row of processing elements comprising a first processing element and a second processing element, the first processing element comprising a first weight register, the second processing element comprising a second weight register, both of the first weight register and the second weight register being controllable by a weight load signal; and a controller configured to: provide the first weight from the memory to the row of processing elements; set the weight load signal to enable the first weight to propagate through the row to reach the first processing element; and set the weight load signal to store the first weight at the first weight register and the flush value at the second weight register.

20 Claims, 16 Drawing Sheets

US 11,275,997 B1

WEIGHT LOADING IN AN ARRAY

BACKGROUND

Artificial neural networks are computing systems with an architecture based on biological neural networks. Artificial neural networks can be trained, using training data, to learn about how to perform a certain computing task.

A neural network may include a set of processing nodes. Each processing node can process a piece of the input data based on a weight to generate an output, and the final decision can be generated based on a combination of the outputs of the set of processing nodes. As part of the processing, each processing node can perform a set of arithmetic operations such as, for example, floating-point multiplications and additions involving the weights and the input data. A neural network may be implemented by circuitries and data paths, such as a systolic array, which comprises an array of data processing units capable of performing concurrent arithmetic operations. The throughput of neural network processing may depend on how the systolic array loads and updates the weights used for the neural network processing.

BRIEF DESCRIPTION OF THE DRAWINGS

Various embodiments in accordance with the present disclosure will be described with reference to the drawings, in which.

DETAILED DESCRIPTION

Figure 1A:
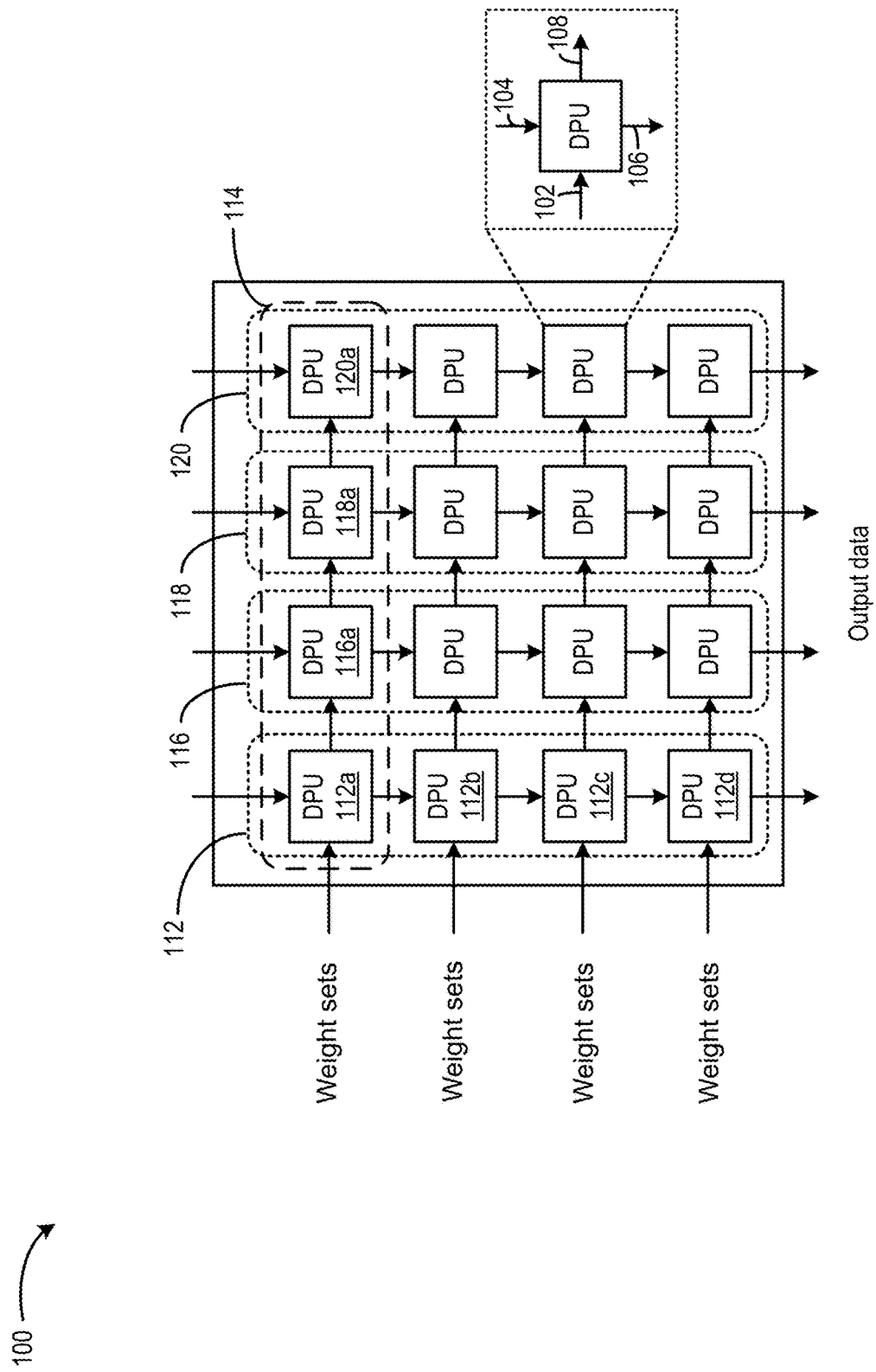
FIG. 1A illustrates an example of a systolic array.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Embodiments of the present disclosure relate to an apparatus for performing neural-network processing of data. More specifically, the apparatus comprises a controller, as well as an array of processing elements configured as a systolic array. The array of processing elements includes a first processing element and a second processing element. The first processing element includes a configurable pipeline register configured to select, based on a control signal from the controller, between propagating a weight value received from the controller to the second processing element and propagating a flush value to the second processing element. The first processing element further includes a weight register configured to store the weight value based on the control signal, and arithmetic circuitries configured to perform arithmetic operations for a neural network based on the weight value from the weight register.

An artificial neural network (herein after "neural network") may include multiple processing nodes. The processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. The processing nodes in the intermediate layers may combine the scaled elements received from each processing node of the input layer to compute a set of intermediate outputs. For example, each processing node in the intermediate layers may compute a sum of the element-weight products, and then generate an intermediate output by applying an activation function to the sum. The intermediate outputs from each processing node of one intermediate layer may be considered as an activated vote (or no-vote), associated with a weight indicating the vote's influence, to determine the intermediate output of the next intermediate layer. The output layer may generate a sum of the scaled intermediate outputs from the final intermediate layer, and generate a binary output (e.g., "yes" or "no") based on whether the sum of the scaled intermediate outputs exceeds a threshold. Due to the combination of scaled elements between layers, the sizes of the higher layers (e.g., the output layer, the intermediate layers immediately before the output layer, etc.) typically are smaller than the sizes of the lower layers (e.g., the input layer, the intermediate layers immediately after the input layer, etc.).

As discussed above, the processing nodes may be implemented by a systolic array, which comprises an array of data processing units capable of performing concurrent arithmetic operations including additions and multiplications. FIG. 1A illustrates an example of a systolic array 100, which includes an array of data processing units (DPU) connected in a network. The array of DPUs can be arranged into rows and columns. In the example of FIG. 1A, systolic array 100 includes a 4×4 array, with four DPUs in each row and four DPUs in each column. Each DPU may include a row input bus 102, a column input bus 104, a column output bus 106, and a row output bus 108. A DPU may receive input data and weights from a left DPU of the same row (or from external circuitries) via row input bus 102. The DPU may also receive input data from a DPU of the same column above (or from external circuitries) via column input bus 104. Each DPU may include a multiplier and an adder to perform multiplication and addition operations based on the inputs, and transmit the result of the multiplication and addition operations to a DPU of the same column below (or to external circuitries) via column output bus 106. The DPU may also forward the inputs received via row input bus 104 to a right DPU of the same row via row output bus 108.

Systolic array 100 can be configured to perform the arithmetic operations, including multiplications and additions, for a set of processing nodes of a neural network.

Before the arithmetic operations, column 112 of the DPUs (the leftmost column) may prefetch four sets of weights. For example, DPU 112a may receive a set of weight including W0, W1, W2, and W3. Each DPU within row 114 (including DPU 112a, DPU 116a, DPU 118a, and DPU 120a) may include a weight register to store one of the weights. For example, DPU 112a may store W0, DPU 116a may store W1, DPU 118a may store W2, whereas DPU 120a may store W3. Other DPUs in other columns and rows also receive and store a weight. In order to pre-fetch the weights, a column (e.g., column 112) may also receive a stream of weights. Each DPU may receive a weight stream at row input bus 102, retrieve a weight from the weight stream, and pass the rest of the weights stream to the DPU on the right via row output bus 108. The weight registers of the DPU can be coupled with a clock signal to form a pipeline, and each weight in the weights stream can be propagated from the weight register of a DPU (e.g., DPU 116a) to the weight register of an adjacent DPU (e.g., DPU 118a) every clock cycle.

After the weights are stored, column 112 of the DPU can receive a stream of input elements. Each DPU may retrieve an input element from the stream and pass the rest of the input stream to the adjacent DPU on the right. Each DPU may include an input data register to store the input data. The input data registers of the DPUs can also be coupled with a clock signal to form a pipeline, and an input element in the stream can be propagated from one DPU to another DUP every clock cycle. Each DPU may include a multiplier to generate a multiplication product between the input element and the stored weight. The multiplication products generated by the DPUs within a column (including column 112) can be accumulated by an adder within each DPU. In the example of FIG. 1A, with four columns of DPUs, the array can generate outputs for four output data. The four output data can represent an output of a neural network layer. Systolic array 100 can be configured to pre-fetch different weights at different times to perform computations for different neural network layers and/or for different processing nodes of a neural network layer.

In some cases, only a part of systolic array 100 is utilized for a particular neural network computation. For example, columns 112 and 116 of systolic array 100 are used to perform computations for a neural network layer, whereas columns 118 and 120 are not used for those computations. In order to replace the old weights with new weights stored in columns 112 and 116 (e.g., to perform computations for a different neural network layer), the old weights stored in columns 118 and 120 may need to be flushed out. The flushing out of the old weights may include propagating the old weights away from columns 112 and 116 towards columns 118 and 120, and then column 112 can receive a stream of new weights and propagate the stream to column 116.

Figure 1B:
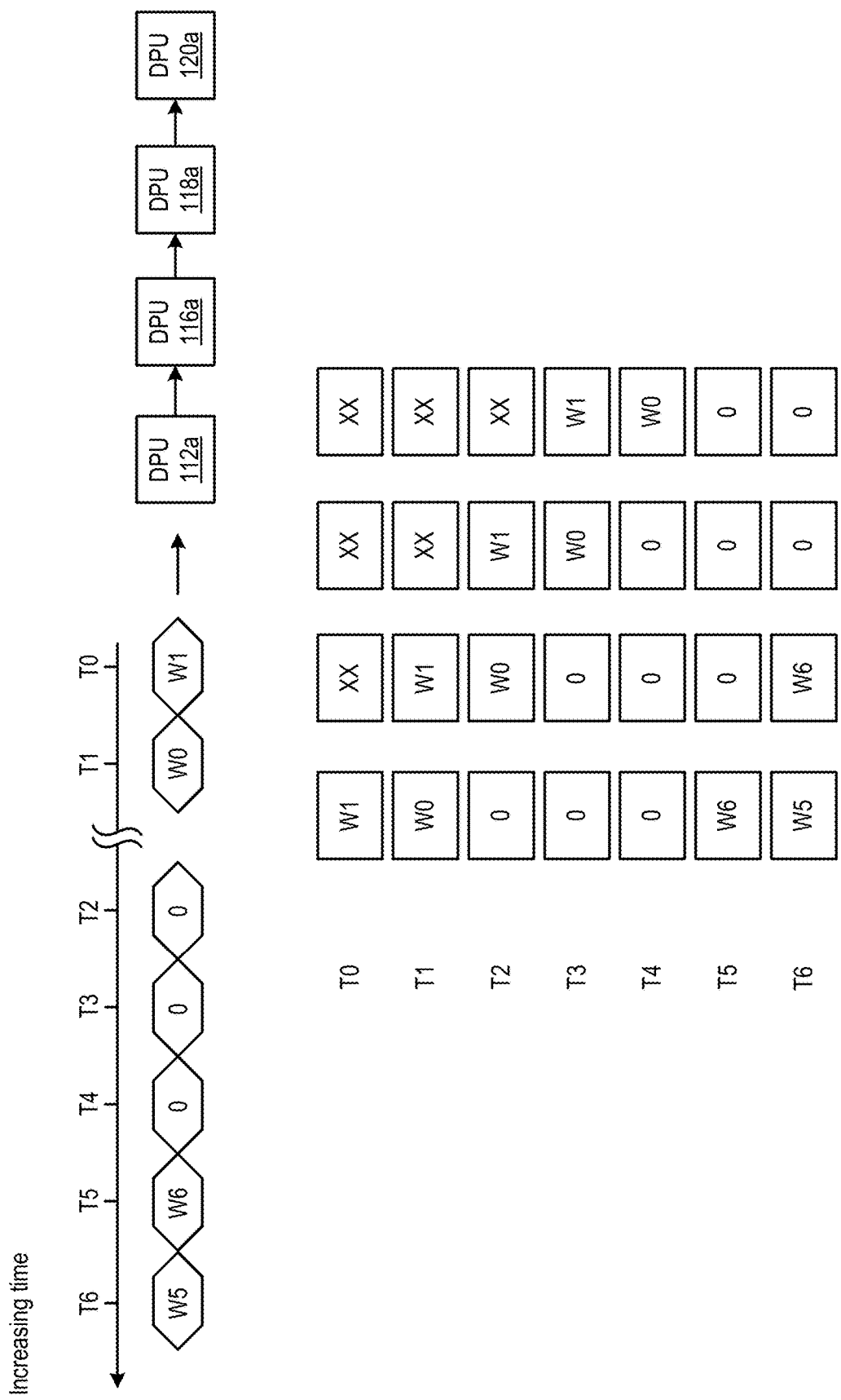
FIG. 1B illustrates an example of weight loading and flushing operations of a systolic array.

FIG. 1B illustrates an example of flushing and loading new weights in row 114. In this example, for a first neural network computation, DPU 112a may store W0 and DPU 116a may store W1. For a second neural network computation, DPU 112a may store W5 and DPU 112b may store W6. DPU 118a and DPU 120a are not to be used for the computations. DPU 112a may receive a stream of weights including W1 and W0. At time T0, DPU 112a receives and stores W1 at a weight register. At time T1, DPU 112a receives and stores W0, whereas DPU 116a receives W1 from DPU 112a and stores W1 at its weight register. DPU 112a and DPU 116a can use the stored weights for the computations between times T1 and T2. At T2, DPU 112a can propagate weight W0 to DPU 116a as part of the flushing process, whereas DPU 112 receives and stores a flush value (e.g., zero). Within time T2, DPU 116a also propagates weight W1 to DPU 118a as part of the flushing process. The weights W0 and W1, followed by the flush values, propagate across DPU 118a and DPU 120a between times T2 and T4. Between times T2 and T4, the output of row 114 (and systolic array 100), including the outputs from DPUs 118a and 120a, may be ignored and not used in the neural network computations to avoid the output of DPU 118a and DPU 120a contaminating the result of the neural network computations. At time T5, DPU 112a receives the new weight W6 and stores W6 at the weight register. At time T6, DPU 112a receives and stores W5, whereas DPU 116a receives W6 from DPU 112a and stores W6 at its weight register. A new set of computations may then begin after T6.

In the example of FIG. 1B, the flushing of the weights from DPU 112a and 116a, which includes propagating the old weights to the right of row 114, adds considerable latency (e.g. a duration between T2 and T4), and new computations may not begin until the old weights are propagated out from DPUs 118a and 120a. This flushing latency can add to the total latency of pre-fetching weights at systolic array 100, which can lower the throughput of systolic array 100 and degrade its performance.

Embodiments of the present disclosure relate to an apparatus for performing neural-network processing of data. More specifically, the apparatus comprises a controller, as well as an array of processing elements configured as a systolic array. The array of processing elements includes a first processing element and a second processing element. The first processing element includes a configurable pipeline register configured to select, based on a control signal from the controller, between propagating a weight value received from the controller to the second processing element and propagating a flush value to the second processing element. The first processing element further includes a weight register configured to store the weight value based on the control signal, and arithmetic circuitries configured to perform arithmetic operations for a neural network based on the weight value from the weight register.

Compared with the weight flushing arrangement of systolic array 100, embodiments of the present disclosure can reduce the flushing latency by not propagating the weights to the columns of DPUs not involved in the computations in the flush operation. For example, the pipeline registers in DPU 112a and 116a can be controlled to propagate the weights as part of the weight-fetching operation. After a weight register obtains a weight from a pipeline register within the DPU, the pipeline register at each DPU (including DPUs 118a and 120a) can be controlled to read in a flush value (e.g., zero), and the weight registers at DPUs 118a and 120a can also read in the flush value from the pipeline registers. As a result, DPUs 118a and 120a will not receive the weights stored at DPU 112a and 116a as part of the flushing operation, and the extra duration (e.g., between periods T2 and T5) used for flushing out the weights at DPUs 118a and 120a can be eliminated. Such arrangements can reduce the total latency of pre-fetching weights at systolic array 100, which can increase the throughput of systolic array 100 and improve its performance.

Figure 2:
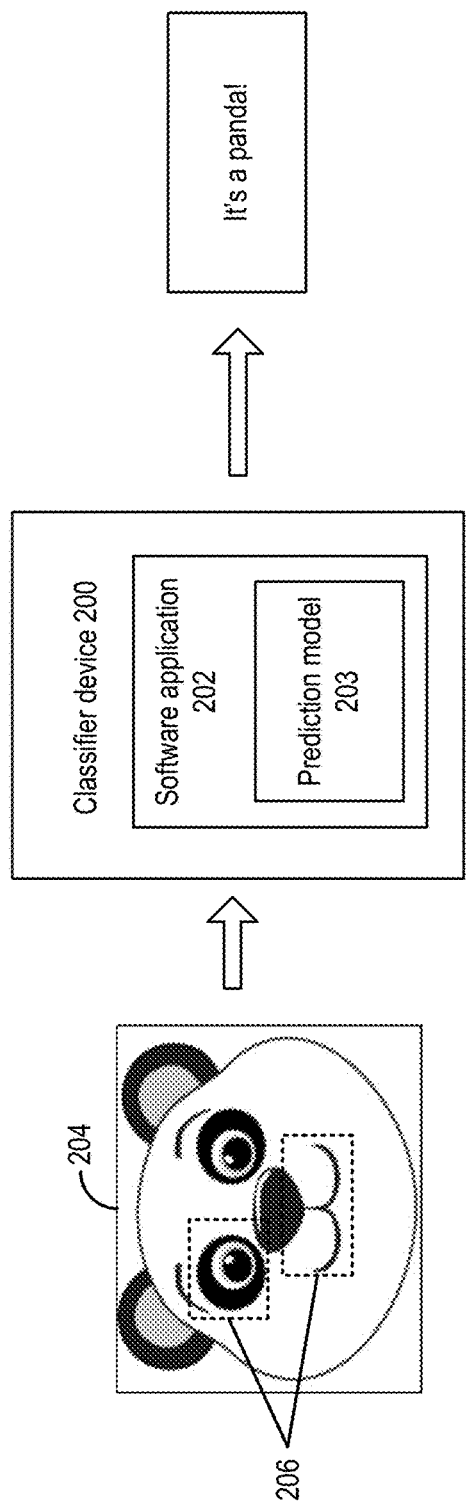
FIG. 2 illustrates an example classifier device that uses techniques disclosed herein to process data.

FIG. 2 illustrates an example classifier device 200 that uses techniques disclosed herein to process data. Classifier device 200 can be, for example, a computing device operating a software application 202 and a prediction model 203 to predict information included in a data sequence, and perform a pre-determined function based on the prediction.

For example, classifier device 200 can be part of an image recognition service provided to identify certain objects (e.g., texts, a person, etc.) from an image. It is understood that the image recognition service is merely provided as an illustrative example, and that techniques disclosed herein can be used for other data processing applications including, for example, text-based data processing (e.g., processing of search queries), audio data processing, etc.

The image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommission it when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 2, the multi-tenant compute service system may provide the image recognition service when the client needs it and decommissioned when it is no longer needed, such that the resources supporting the image recognition service (e.g., access to software application 202, and the underlying hardware resources for processing software application 202) can be reallocated to other clients.

As shown in FIG. 2, software application 202 can receive pixel data of an image 204 from a user. Image 204 may include an array of pixels. Software application 202 can perform analysis on the pixel data, and predict one or more objects 206 depicted in image 204. The analysis may include, for example, comparing the pixel data against a set of pre-determined features data. The pre-determined features data may include data associated with a set of pre-determined visual image features such as, for example, a nose object, a mouth object, etc. The pre-determined features data may also include data associated with non-visual image features, or a combination of visual and non-visual image features. As to be discussed in more detail below, software application 202 may employ prediction model 203 to compute a set of scores based on the pixel data of image 204. The set of scores may represent, for example, the likelihood of image 204 including the image features represented by the features data. Software application 202 can then determine other information about the content of image 204 based on the scores. For example, based on the scores, software application 202 can determine that image 204 is an image of a panda.

Figure 3A:
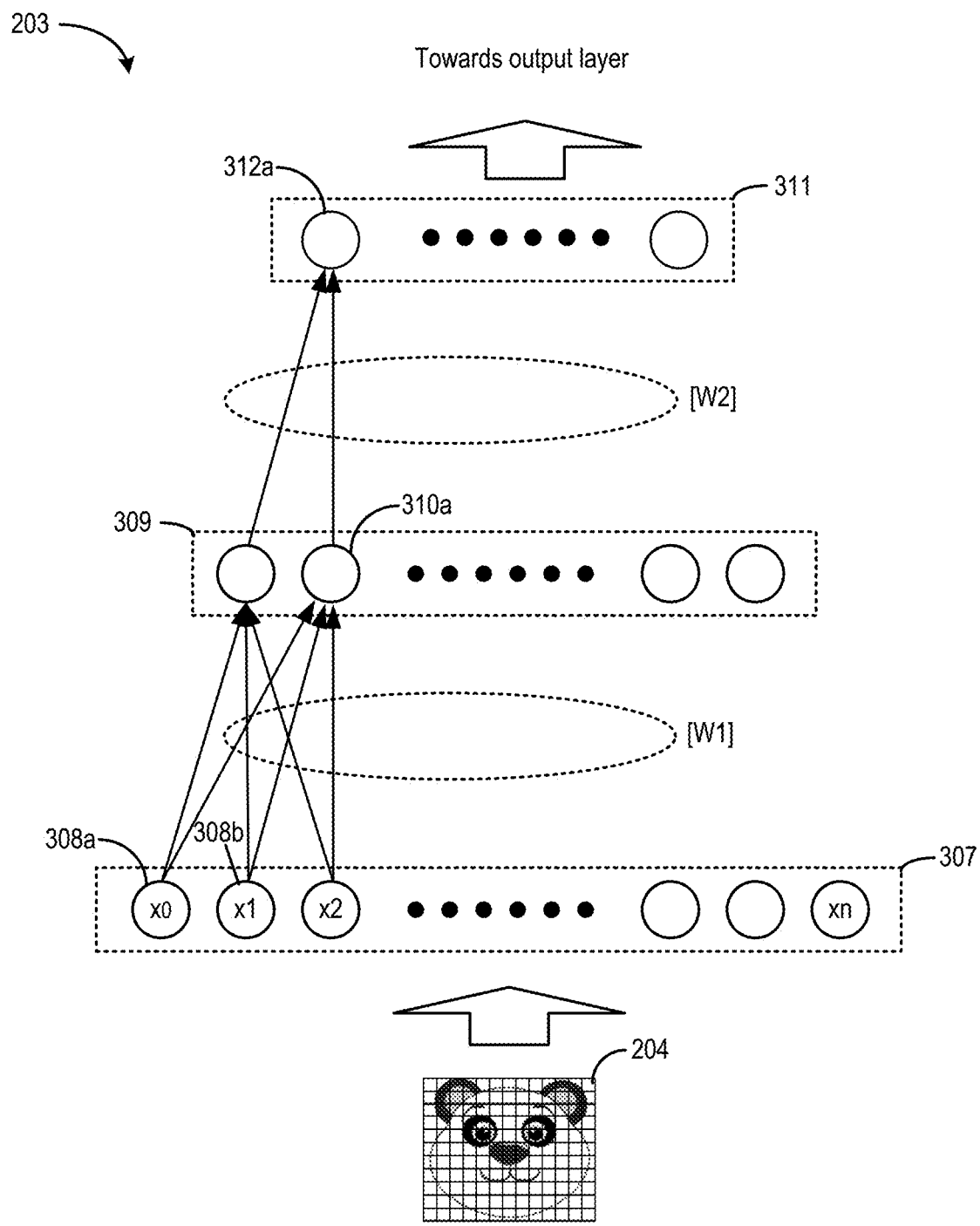
FIGS. 3A-3D are simplified block diagrams illustrating a prediction model and the computations that use techniques disclosed herein, according to certain aspects of the present disclosure.

Prediction model 203 can be in the form of an artificial neural network. The artificial neural network may include a plurality of processing nodes, with each processing node configured to process part of the input pixel data, or to further process the intermediate outputs from other processing nodes. FIG. 3A illustrates an example of prediction model 203 that uses techniques disclosed herein. In FIG. 3A, prediction model 203 may be a multi-layer neural network such as a deep neural network (DNN), a convolutional neural network (CNN), etc. Prediction model 203 may include an input layer 307, a set of intermediate layers including intermediate layers 309 and 311, and an output layer (not shown in FIG. 3A).

Layer 307 may process pixel data representing different portions of image 204. For example, in the example of FIG. 3A, layer 307 may process the pixel data of image 204. Each processing node of layer 307 is assigned to receive a pixel value (e.g., $x_0$, $x_1$, $x_2$, ... $x_n$) corresponding to a pre-determined pixel within image 204, and transmit one or more weights with the received pixel value to layer 309. In a case where prediction model 203 is a DNN, each processing node of layer 307 can be assigned a set of weights defined based on a matrix W1. Each processing node of layer 307 can send the received pixel value and the assigned weights to each processing node of layer 309. In a case where prediction model 203 is a CNN, groups of the processing nodes of layer 307 may share a set of weights, and each group may send the set of weights and the pixel values received by the group of processing nodes to a single processing node of layer 309.

Layer 309 may process the scaled outputs from layer 307 to generate a set of intermediate outputs. For example, assuming processing node 310a of layer 309 is connected to n processing nodes in layer 307, processing node 310a may generate a sum of the scaled outputs received from layer 307 based on the following equation:

$$sum_{310a} = \sum_{i=0}^{n}(W1_i \times x_i) \qquad \text{(Equation 1)}$$

Here, $sum_{310a}$ represents a sum generated by processing node 310a. $W1_i \times x_i$ represents a scaling of a particular pixel value (e.g., $x_0$) with the associated weight (e.g., W10) by a processing node of layer 307. In a case where prediction model 203 is a DNN, each processing node of layer 309 may generate the sum based on the scaling of pixel values from each processing node of layer 307, and then generate a sum (e.g., $Sum_{310a}$) by summing the scaled pixel values. The sum may also represent a dot-product between an input vector comprising a number of elements (e.g., pixel values) and a weight vector (e.g., W1).

Figure 3B:
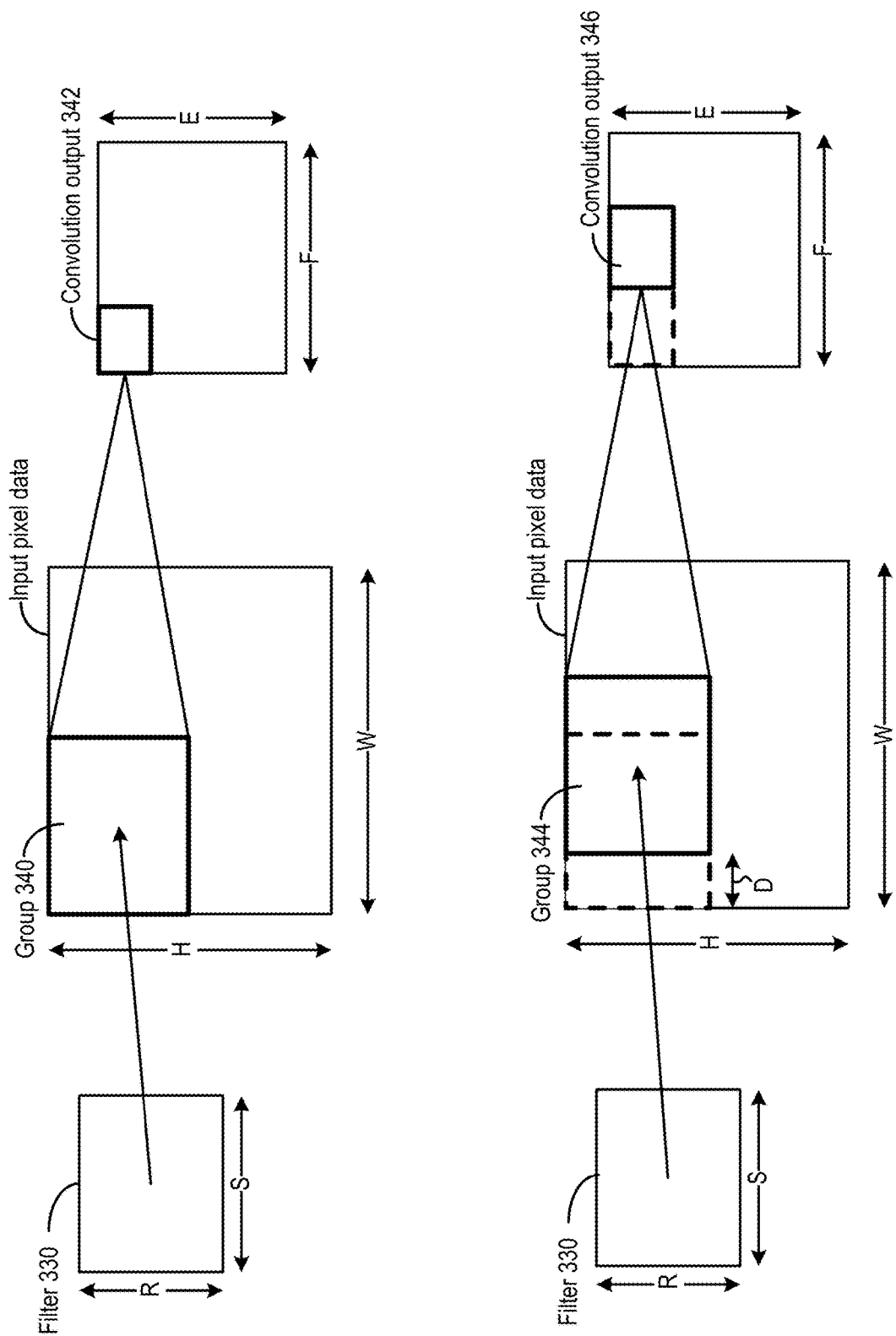

On the other hand, in a case where prediction model 203 is a CNN, each processing node of layer 309 may generate the sum based on the scaling of pixel values from a group of processing nodes of layers 307. The sum may represent a convolution result between a group of pixel values and a filter comprising the weight values. FIG. 3B illustrates an example of a convolution operation layer 309 may perform. In FIG. 3B, filter 330 may include a two-dimensional array of weights. The weights in filter 330 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 309 (e.g., processing node 310a) can receive, from a group of processing nodes of input layer 307, a group 340 of pixel values corresponding to a first rectangular block of pixels from the input image, and generate a convolution output 342 based on a summation of multiplication results between each weight of filter 330 and each corresponding pixel in group 340 according to Equation 1, to generate a dot-product between a matrix represented by filter 330 and a matrix represented by group 340. Another processing node of layer 309 can also receive, from another group of processing nodes of input layer 307, a group 344 of pixel values corresponding to a second rectangular block of pixels from the input image, and generate a convolution output 346 based on a summation of multiplication results between each weight of filter 330 and each corresponding pixel in group 244 according to Equation 1, to generate a dot-product between the matrix of filter 330 and a matrix represented by group 340. In some examples, each convolution output in FIG. 3B (e.g., convolution output 342, convolution output 346, etc.) can correspond to the output of a processing node of layer 309. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 3B, the convolution operations can be arranged in a sliding-window such that the second rectangular block overlaps, or is otherwise adjacent to, the first rectangular block in the input image. For example, in the example of FIG. 3B, D may be a distance of stride (in pixel) of the sliding-window for each convolution operations, such that the block of pixels corresponding to group 344 may be situated at a distance D (in terms of pixels) from the block of pixels corresponding to group 340, and the next block of pixels may also be situated at the same distance D from group 344. Other processing node of layer 309 may also receive groups of pixels corresponding to other rectangular blocks and generate other intermediate outputs. The convolution outputs can be part of a convolution output array 380 with a height of E rows and a width of F columns. The array of convolution outputs can have a smaller height and a smaller width than the input image. Rectangular blocks of the convolution outputs can be further grouped, and convolution operations can be performed at layer 311 between the groups of convolution outputs and another set of filter weights to generate another set of convolution outputs.

Figure 3C:
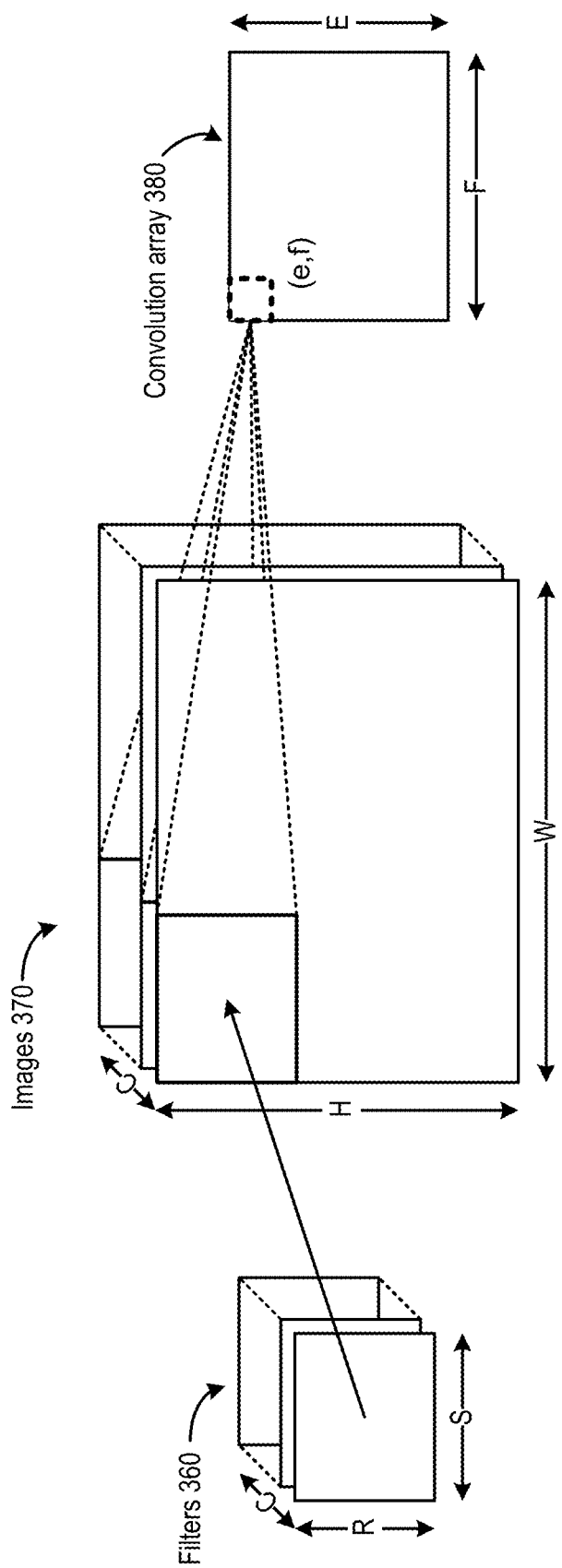

In some examples, the convolution operations can be performed between multiple images and multiple filters. For example, referring to FIG. 3C, a set of C filters 360 may corresponds to a number (C) of images 370, and convolution operations can be performed between each filter of the set of filters 360 and blocks of pixels on the corresponding image of images 370. The convolution results for each filter-image pair can be summed to generate a convolution output as follows:

$$O_{e,f} = \sum_{r=0}^{R-1}\sum_{s=0}^{S-1}\sum_{c=0}^{C-1} X^c_{eD+r,fD+s} \times W^c_{r,s} \quad \text{(Equation 2)}$$

Here, the convolution operation involves the images (or pixel arrays). $X^c_{eD+r,fD+s}$ may refer to the value of a pixel at an image of index c, within the number (C) of images 370, with a horizontal pixel coordinate of eD+r and a vertical pixel coordinate of fD+s. D is the sliding-window stride distance, whereas e and f correspond to the location of the output in the convolution output array, which can also correspond to a particular sliding window. Further, r and s correspond to a particular location within the sliding window. A pixel at an (r, s) location and of an image of index c can also correspond to a weight $W^c_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the image within the image set can be computed. And then a sum of the partial sums for all images of the image set can be computed.

Moreover, in some examples, multiple sets of filters can be used to perform convolution operations with a set of images to generate a set of convolution output arrays, with each convolution output array corresponding to a set of filters. For example, the multiple sets of filters may correspond to multiple features to be detected from the set of images, and each convolution output array may correspond to the detection results for each feature from the set of images. For example, where M sets of filters are applied to C images to generate M convolution output arrays, Equation 2 can be updated as follows:

$$O^m_{e,f} = \sum_{r=0}^{R-1}\sum_{s=0}^{S-1}\sum_{c=0}^{C-1} X^c_{eD+r,fD+s} \times W^{c,m}_{r,s} \quad \text{(Equation 3)}$$

Here, convolution output $O_{e,f}^m$ and weight $W^{c,m}_{r,s}$ has an index m corresponding to one of the M sets of filters.

Figure 3D:
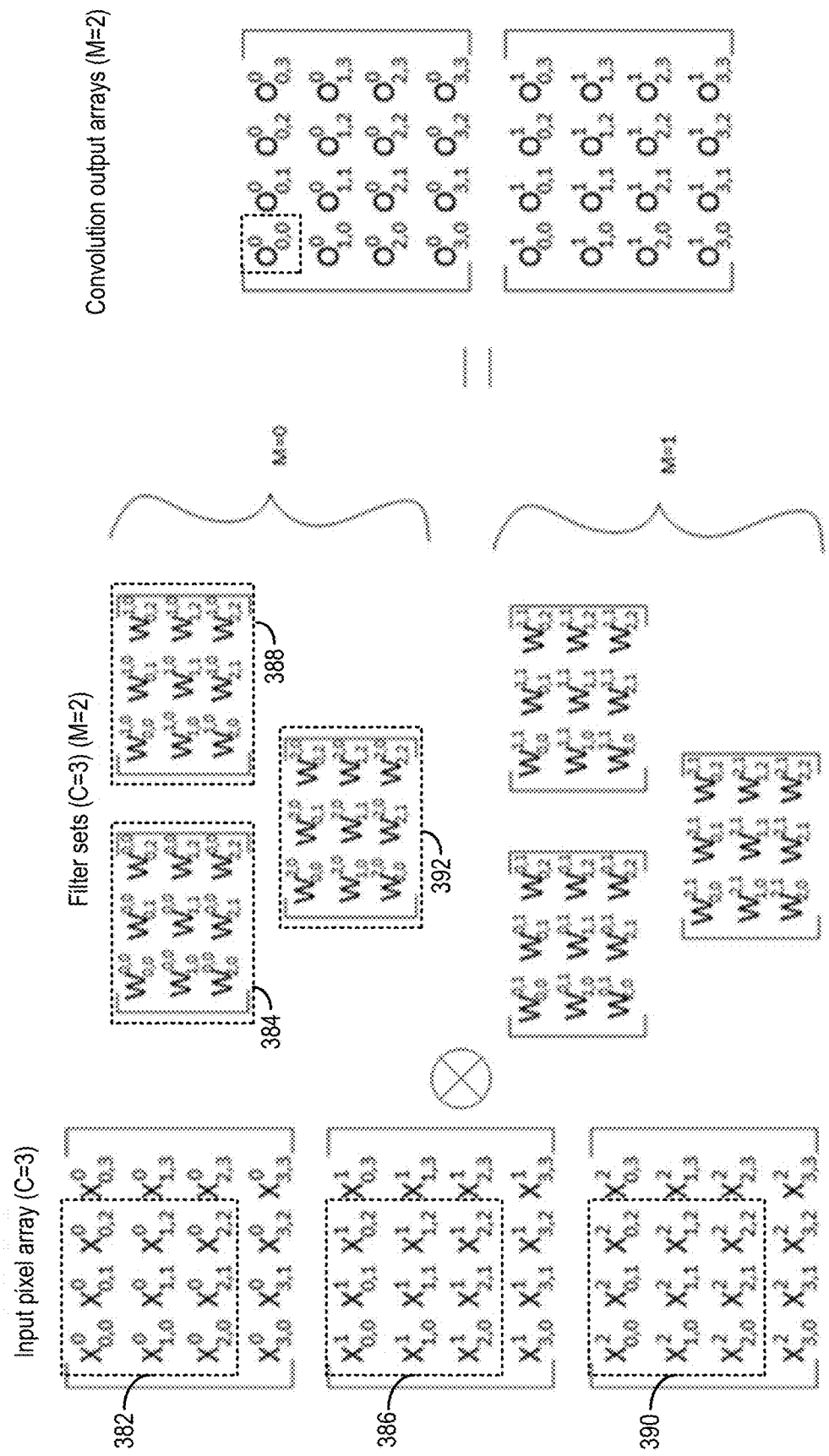

FIG. 3D illustrates an example of C sets of input data sets (with C=3) to be convolved with M sets of filters (with M=2). Each set of input data corresponds to the entries of a pixel array. Each of the M sets of filters includes a set of C filters which correspond to the C sets of input pixel arrays. The convolution operations generate M sets of output data sets, with each output data set corresponding to a convolution output array. Each convolution output array corresponds to convolving one set (of the M sets) of filters with the input pixel arrays. For example, $O_{0,0}^0$ can be generated by a sum of the dot-product between group of pixels 382 and filter array 384, the dot-product between group of pixels 386 and filter array 388, and the dot-product between group of pixels 390 and filter array 392.

Referring back to FIG. 3A, one processing node of layer 309 may be configured to generate the convolution outputs (e.g., one at a time) of one convolution output array, and a set M of processing nodes of layer 309 can correspond to a set M of convolution output arrays. The processing node of layer 309 can also process each convolution output with an activation function to generate an activation output. The activation function may translate the convolution output into a decision of whether to forward the convolution output to intermediate layer 311 to influence the classifier decision (analogous to the firing of a biological neuron). An example of the activation function can be a rectified linear unit (ReLu) defined according to the following equation:

$$\text{ReLu}(y) = \max(0, y) \quad \text{(Equation 4)}$$

A processing node of layer 309 (e.g., processing node 310a) may process the sum with the ReLu function to generate a first intermediate output based on the following equation:

$$\text{first\_intermediate\_output}_{210a} = \text{ReLu}(\text{Sum}_{310a}) \quad \text{(Equation 5)}$$

In a case where prediction model 103 is a CNN, prediction model 103 may include a pooling layer (not shown in FIG. 3A) to reduce the size of the first intermediate outputs. For example, the pooling layer may perform a downsampling operation and forward a maximum intermediate output (generated based on the ReLu function) among a group of intermediate outputs (while discarding the rest of the intermediate outputs in the group) to layer 311.

Layer 311 may further process the scaled intermediate outputs from layer 309 by, for example performing additional convolution operations based on different sets of filters. The outputs from each processing node of layer 311 may be forwarded to other higher intermediate layers, or to an output layer (not shown in FIG. 3A). The output layer may form an output vector representing, for example, a probability that certain features are included in image 204, and/or a probability that image 204 includes an image of a panda. For example, the output vector may be compared against a reference vector associated with a nose object of a panda, or a reference vector associated with a panda. A decision about whether image 204 is an image of a panda can be determined based on the comparison result.

Figure 4A:
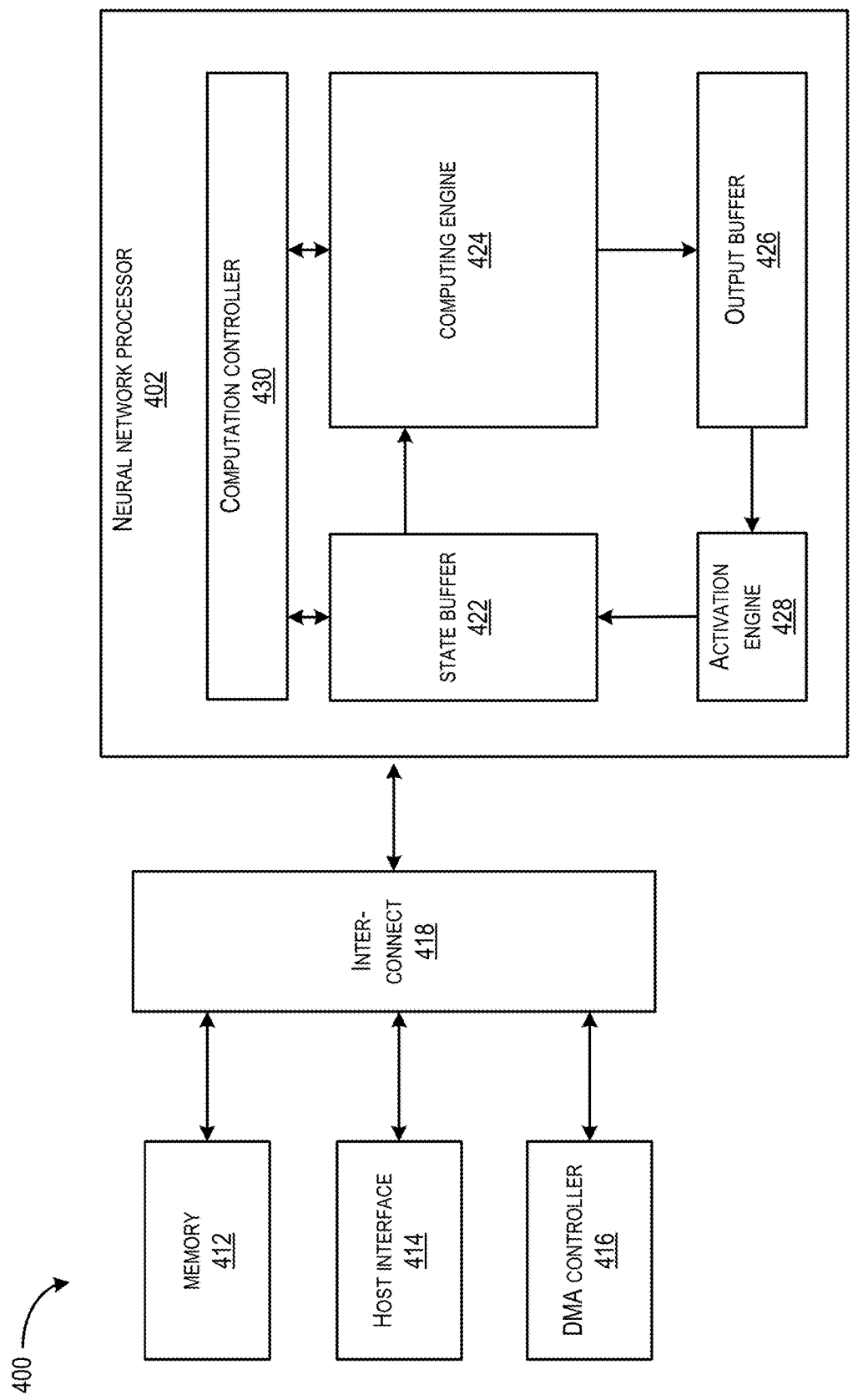
FIGS. 4A-4E are simplified block diagrams for some of the components of an apparatus for implementing the prediction model of FIGS. 3A-3D, according to certain aspects of the present disclosure.

FIG. 4A shows an apparatus 400 according to some embodiments of the present disclosure. Apparatus 400 may be part of a computer system, e.g., a host server. Apparatus 400 may be part of a multi-tenant compute service system and can communicate with a host device (not shown in FIG. 4A) to provide computing and memory resources for a computing service. For example, referring back to FIG. 2, apparatus 400 may provide computing and memory resources for computations with prediction model 203. A host device can operate software application 202 and communicate with apparatus 400 to perform one or more image recognition tasks based on computations with prediction model 203.

In the example of FIG. 4A, apparatus 400 may include a neural network processor 402 coupled to memory 412, a direct memory access (DMA) controller 416, and a host interface 414 via an interconnect 418. As to be discussed in more detail, neural network processor 402 can provide the computing resources to support the computations with prediction model 403. Memory 412 may be configured to store the instructions, input data (e.g., input pixel groups 382, 386, and 390) and the weights (e.g., weights from filter arrays 384, 388, and 392) received from the host device. Memory 412 may also be configured to store the output of neural network processor 402 (e.g., one or more image recognition decisions on the input images) at memory 412. Memory 412 may include any suitable memory, e.g., dynamic random access memory (DRAM), synchronous DRAM (SDRAM), double data rate DRAM (DDR DRAM), storage class memory (SCM), flash memory devices, etc.

DMA controller 416 may be configured to perform DMA operations to transfer data between neural network processor 402 and the host device. For example, as discussed above, the host device can store the instructions, input data, and the weights at memory 412. The host device can provide the memory addresses for the stored instructions, data and weights to neural network processor 402 (e.g., in the form of memory descriptors). Neural network processor 402 can then obtain the stored instructions, data, and weights based on the memory addresses provided by the host device. Neural network processor 402 can also store the results of computations (e.g., one or more image recognition decisions) at memory 412, and provide the memory addresses for the stored results to the host device.

Host interface 414 may be configured to enable communication between the host device and neural network processor 402. For example, host interface 414 may be configured to transmit the memory descriptors including the memory addresses of the stored data (e.g., input data, weights, results of computations, etc.) between the host device and neural network processor 402. Host interface 414 may include, for example, a peripheral component interconnect express (PCIe) interface or any suitable interface for communicating with the host device.

Neural network processor 402 can provide the computing resources to support the computations with prediction model 203. In the example of FIG. 4A, neural network processor 402 may include a state buffer 422, a computing engine 424, an output buffer 426, an activation engine 428, and a computation controller 430.

State buffer 422 may be configured to provide caching of data used for computations at computing engine 424. The data cached at state buffer 422 may include, for example, the input data and weights obtained from memory 412, as well as intermediate outputs of computations at computing engine 424. The caching can reduce the effect of memory access bottleneck (e.g., caused by the latencies at memory 412, DMA controller 416, interconnect 418, etc.) on the performance of computing engine 424. State buffer 422 can be an on-chip memory device and may include, for example, static random access memory (SRAM).

Computing engine 424 may include a set of processing elements configured to perform one or more arithmetic operations involved in neural network computations. For example, computing engine 424 may include a set of multipliers to perform the scaling of input data with associated weights, and a set of adders to generate a sum of the results of multiplications representing dot-products and convolution results, as discussed above. The weights and the input data can be obtained from state buffer 422.

In addition, neural network processor 402 also includes an output buffer 426. Output buffer 426 includes a set of registers to store the outputs of computing engine 424. Output buffer 426 also enables additional processing such as, for example, a pooling operation to reduce the size of the stored outputs. In some examples, computing engine 424 can be operated to perform computations for a particular neural network layer, and output buffer 426 can process the outputs of that neural network layer and store the processed outputs (with or without processing by activation engine 428) at state buffer 422.

In addition, activation engine 428 can be configured to apply one or more activation functions (e.g., ReLu function) on the output of output buffer 426. For example, activation engine 428 may include one or more lookup tables (e.g., in the form of multiplexer circuits) that map the input to one of the candidate outputs representing the result of applying the activation function to the input. In some examples, the activation engine 428 may also include a by-pass path to allow outputs from output buffer 426 to be stored directly at output buffer 426 when activation functions are not to be applied.

Figure 4B:
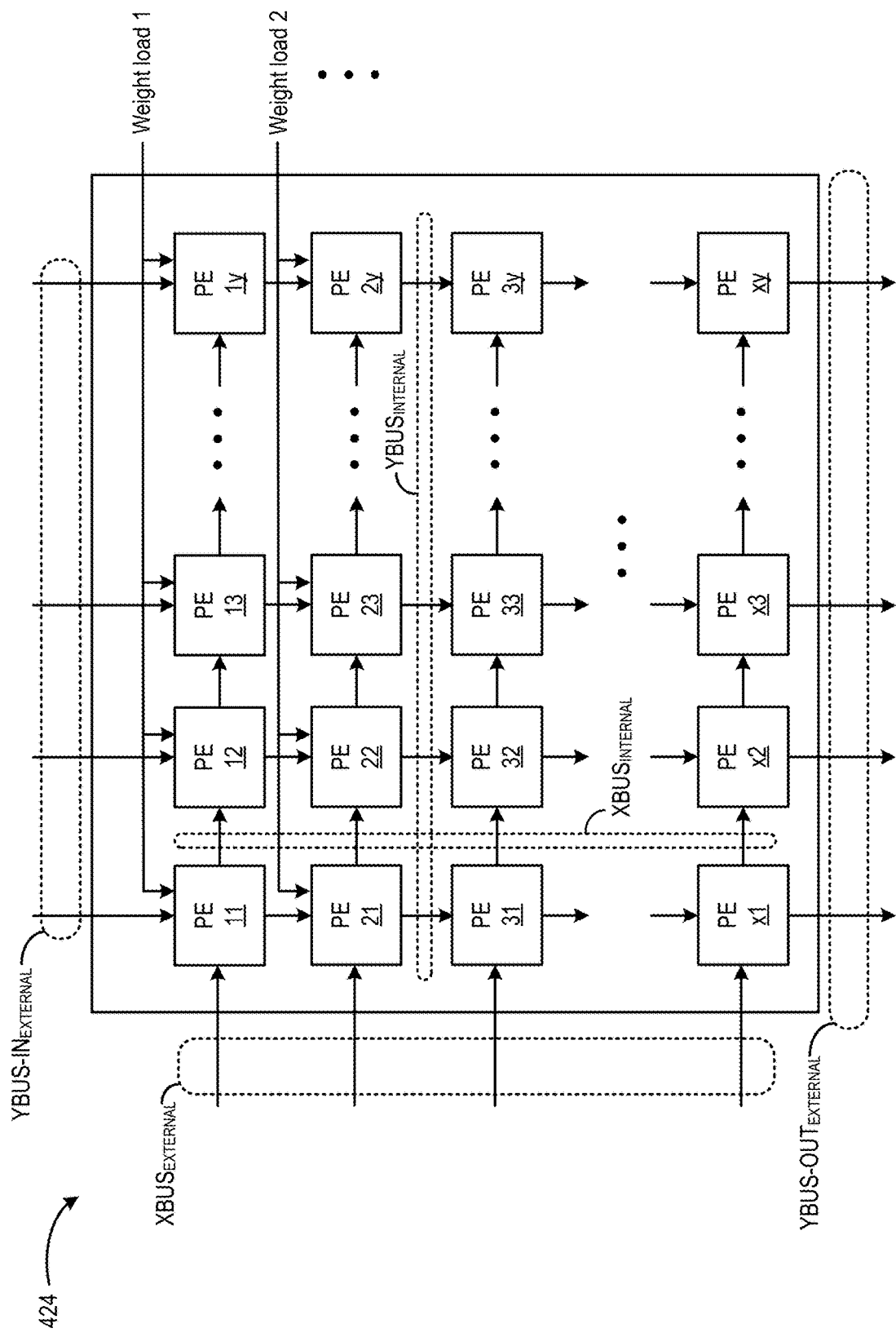

FIG. 4B illustrates an example of an internal structure of computing engine 424. Computing engine 424 may include a two-dimensional array of processing elements (PE) arranged in multiple rows and columns, where the rows can represent a first dimension and the columns can represent a second dimension. As used herein, "rows" and "columns" are interchangeable and are used to represent different dimensions of a two-dimensional array. Each PE may correspond to a DPU in systolic array 100 but include additional circuitries, as to be discussed below. Neighboring PEs within each row (e.g., PEs 11, 12, 13, . . . 1y) are connected with each other via internal row buses $XBUS_{INTERNAL}$, whereas PEs 11, 21, 31, . . . x1 of the leftmost column are connected to state buffer 422 via a set of external row buses $XBUS_{EXTERNAL}$. Moreover, neighboring PEs within each column are connected with each other via internal column buses $YBUS_{INTERNAL}$. PEs 11, 12, 13, . . . 1y of the topmost row are connected to state buffer 422 via a set of external input column buses $YBUS\text{-}IN_{EXTERNAL}$. External internal input column buses $YBUS\text{-}IN_{EXTERNAL}$ may be driven by computation controller 430 to state to, for example, reset the computations in computing engine 424. Further, PEs x1, x2, x3, . . . , xy of the bottom row are connected to output buffer 426 via a set of external column buses $YBUS\text{-}OUT_{EXTERNAL}$.

In addition, each row of PEs may be coupled with a weight load signal. For example, a first row of PEs (PEs 11, 12, . . . , 1y) may be coupled with a weight load signal 1. Moreover, a second row of PEs (PEs 21, 22, . . . , 2y) may be coupled with a weight load signal 2. As to be described below, the weight load signal may control the pre-fetching and storage of weights, as well as propagation of flush values, within a row of PEs. In addition, each PE within computing engine 424 may also be coupled with a clock signal (not shown in FIG. 4B), to synchronize the loading and propagation of the weights and/or flush values among the PEs.

Figure 4C:
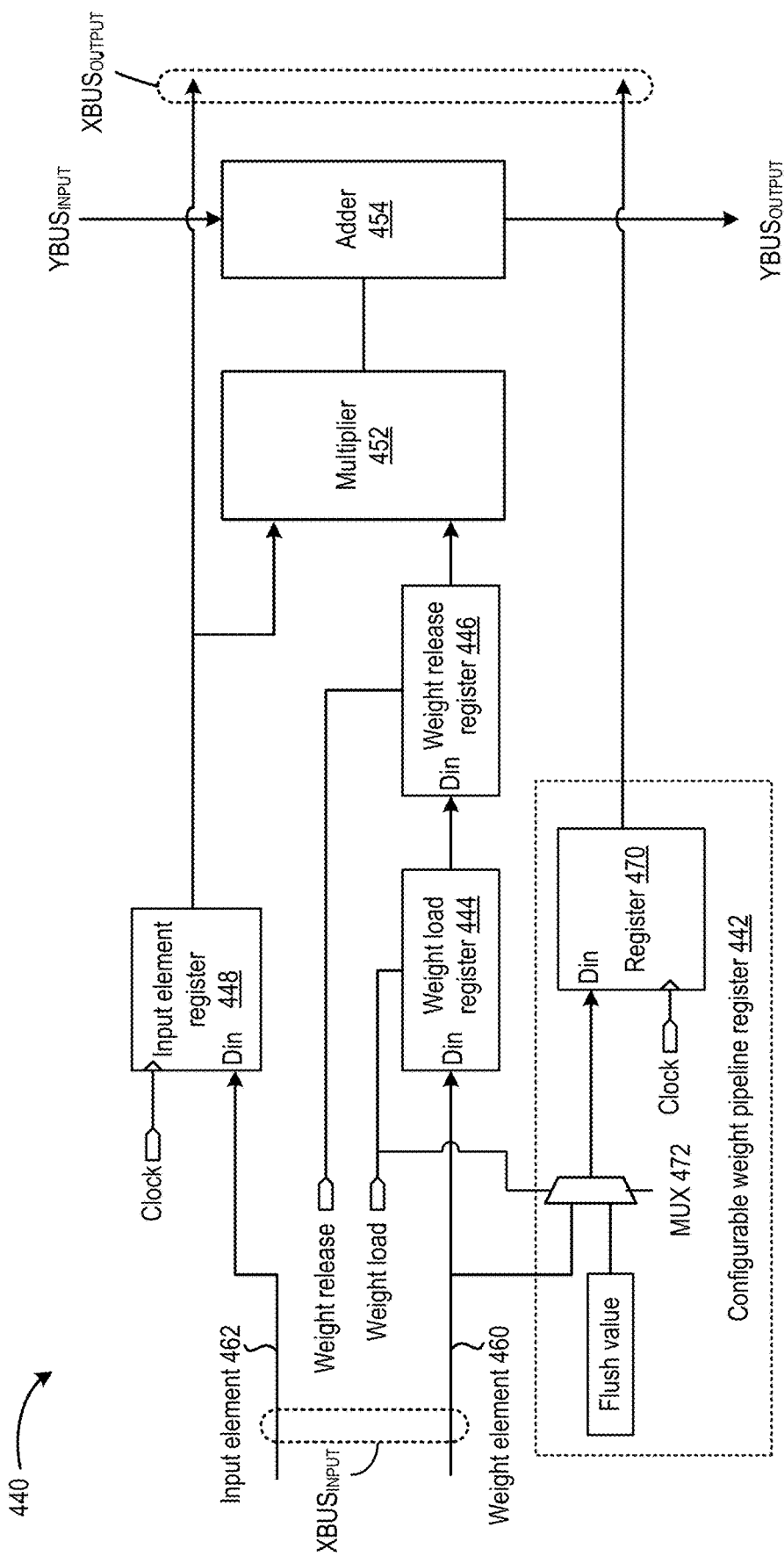

FIG. 4C illustrates an example of an internal structure of a PE 440, which can be any one of the PEs described in FIG. 4B. In the example of FIG. 4C, PE 440 may include a configurable weight pipeline register 442, a weight load register 444, a weight release register 446, an input element register 448, a multiplier 452, and an adder 454. The data input terminal (DIN) of configurable weight pipeline register 442, weight load register 444, and input element register 448 may be coupled with input XBUS (e.g., $XBUS_{INPUT}$). Weight pipeline register 442 and weight load register 444 may receive a weight element 460 from $XBUS_{INPUT}$, whereas input element register 448 may receive an input element 462 also from $XBUS_{INPUT}$. $XBUS_{INPUT}$ may be coupled with internal row buses $XBUS_{INTERNAL}$ or external row buses $XBUS_{EXTERNAL}$. Moreover, the DIN terminal of weight release register 446 is coupled with the output of weight load register 444.

Weight load register 444 and weight release register 446 may provide weight element 460 to multiplier 452, whereas input element register 448 may provide input element 462 to multiplier 452. Weight load register 444 may be controlled by a weight load signal (e.g., weight load 1 of FIG. 4B) to store weight element 460, whereas weight release register 446 can be controlled by a weight release signal (not shown in FIG. 4B) to obtain weight element 460 from weight load register 444 to multiplier 452. Weight release register 446 can act as a buffer to allow decoupling between the pre-fetching of weights and the computations involving the weights. For example, the weight load and weight release signals can be asserted at different times to allow pre-fetching of new weight by weight load register 444 to take place while a current weight (e.g., weight element 460) is being buffered at weight release register 446 and provided to multiplier 452.

Each of weight load register 444 and weight release register 446 may include, for example, a latch which can be controlled to latch in weight element 460 by a latch signal provided by, respectively, the weight load or the weight release signals. In some examples, weight load register 444 and weight release register 446 may also include a flip-flop with an enable signal which controls whether the flip-flop latches in an input, and the enable signal can also be provided by the weight load or the weight release signals. For example, the enable signal can gate a clock signal supplied to the flip-flops of weight load register 444 and weight release register 446 such that when the enable signal is de-asserted, no active clock signal is supplied to the flip-flops which prevents the flip-flops from storing and outputting new values provided at the inputs.

Moreover, PE 440 may also propagate an input element of an input element stream as well as a weight element of a weight element stream to the adjacent PE within the row via an output XBUS (e.g., $XBUS_{OUTPUT}$). For example, configurable weight pipeline register 442 may also propagate a value, which can be either weight element 460, another weight element, or a flush value, to the weight load register 444 of an adjacent PE via $XBUS_{OUTPUT}$. Further, input element register 448 may also propagate input element 462 (or another input element) to the input element register 448 of the adjacent PE via $XBUS_{OUTPUT}$. Both configurable weight pipeline register 442 (which includes register 470) and input element register 448 may be coupled with a clock signal, such that the storage and propagation of the weight and input elements are synchronized with the clock signal. In some examples, weight pipeline register 442 can include register 470 as a flip-flop which can operate based on a clock signal. For example, register 470 may store and output a value provided at the input of register 470 upon receiving a clock edge.

Figure 4D:
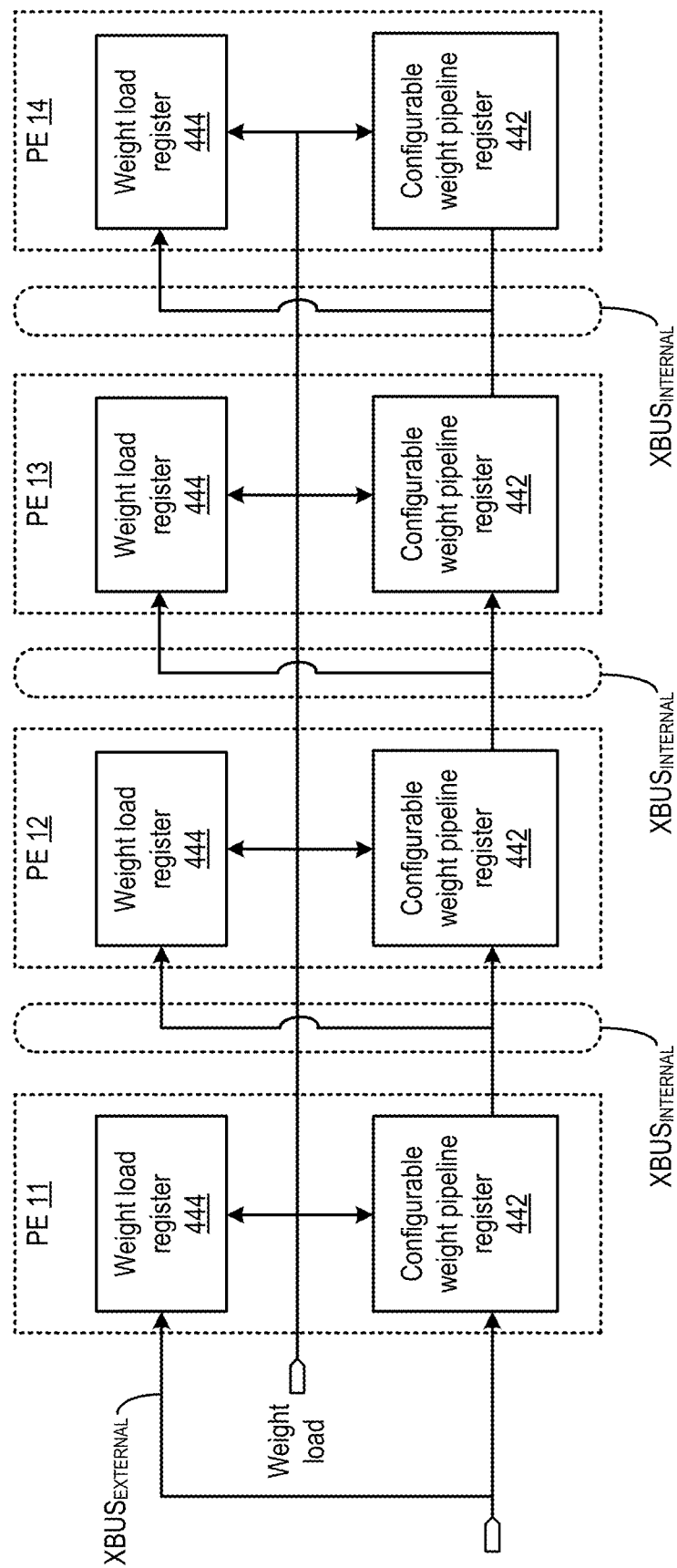

FIG. 4D illustrates an example of the connections of weight pipeline register 442 and weight load register 444 for a row of PEs including PEs 11, 12, 13, and 14. For example, the inputs of both of weight load register 444a and configurable weight pipeline register 442a of PE 11 may be coupled with input bus $XBUS_{INPUT}$. The output of configurable weight pipeline register 442a of PE 11 may be coupled with the inputs of both of weight load register 444b and configurable weight pipeline register 442b of PE 12. The output of configurable weight pipeline register 442b of PE 12 may be coupled with the inputs of both of weight load register 444c and configurable weight pipeline register 442c of PE 13. Further, the output of configurable weight pipeline register 442c of PE 13 may be coupled with the inputs of both of weight load register 444d and configurable weight pipeline register 442d of PE 14.

Referring back to FIG. 4C, configurable weight pipeline register 442 can be configured to select between propagating (to the weight load register 444 of the adjacent PE) weight element 460 (or other weight element received via $XBUS_{INPUT}$) and propagating a flush value (which can be zero, or any pre-determined value). The selection can be based on the weight load signal. For example, a de-asserted weight load signal can cause weight load register 444 not to latch in the weight element provided by $XBUS_{INPUT}$ (e.g., because the weight element is not to be used for computations at PE 440), while allowing control configurable weight pipeline register 442 to propagate the weight element to the next PE (e.g., from PE 11 to PE 12 of FIG. 4D). On the other hand, an asserted weight load signal can, in addition to controlling weight load register 444 to latch in the weight element provided by $XBUS_{INPUT}$ (e.g., because that weight element is to be used for computations at PE 440), control configurable weight pipeline register 442 to latch in the flush value. With such arrangements, PE 440 can be controlled not to propagate the weight element to the next PE (and other PEs along the propagation path) which is not involved in the computations, if the weight element is to be stored at PE 440. Because the weight element is not propagated and stored in the next PE and other PEs along the propagation path, there is no need to flush the weight elements stored at those PEs as described in FIG. 1B. This can shorten the time between pre-fetching of weights for the PEs and can improve the performance of computation engine 424.

In the example of FIG. 4C, configurable weight pipeline register 442 may include a multiplexor 472 to perform the selection. For example, multiplexor 472 can be controlled, based on the weight load signal (or a signal derived from the weight load signal), to select between providing a weight element received from $XBUS_{INPUT}$ and providing a flush value to register 470. In some examples, instead of including multiplexor 472, the weight load signal (or a signal derived from the weight load signal) can also be coupled with a reset terminal of register 470, such that an assertion of the weight load signal can reset a state of register 470 to zero (or other pre-determined value).

In some examples, to improve operation, the weight load signal can be buffered to multiplexor 472 and weight load register 444 using different buffer chains, such that multiplexor 472 and weight load register 444 can detect assertion and/or de-assertion of the weight load signal at different times. Such arrangements can ensure that register 470 of a first processing element (e.g., PE 11) latches in the flush value (when the weight load signal detected at configurable weight pipeline register 442 is still asserted) after weight load register 444 of the second processing element (e.g., PE 12) detects the de-assertion of the weight load signal and stops latching in the output of register 470 of the first processing element.

Multiplier 452 and adder 454 can perform arithmetic operations for a neural network. For example, multiplier 452 can generate a multiplication result between weight element 460 and input element 462 and provide the multiplication result to adder 454. Adder 454 can receive a partial sum from the PE above (of the same column) via input YBUS (e.g., $YBUS_{INPUT}$), add the multiplication result to the partial sum, and output the updated partial sum to the PE below (of the same column) via output YBUS (e.g., $YBUS_{OUTPUT}$), such that a column of PE can generate a sum of scaled inputs based on Equation 1 above. In some examples, multiplier 452 and adder 454 may also include additional logic to detect whether an input to multiplier 452 is zero, or a pre-determined flush value received from configurable weight pipeline register 442 of the adjacent PE on the left, and can skip the multiplication and addition and generate a default value (e.g., by forwarding the partial sum received at input YBUS directly to $YBUS_{OUTPUT}$) upon detecting that multiplier 452 receives a zero or a pre-determined flush value, to reduce power and expedite the processing of a flush value.

Figure 4E:
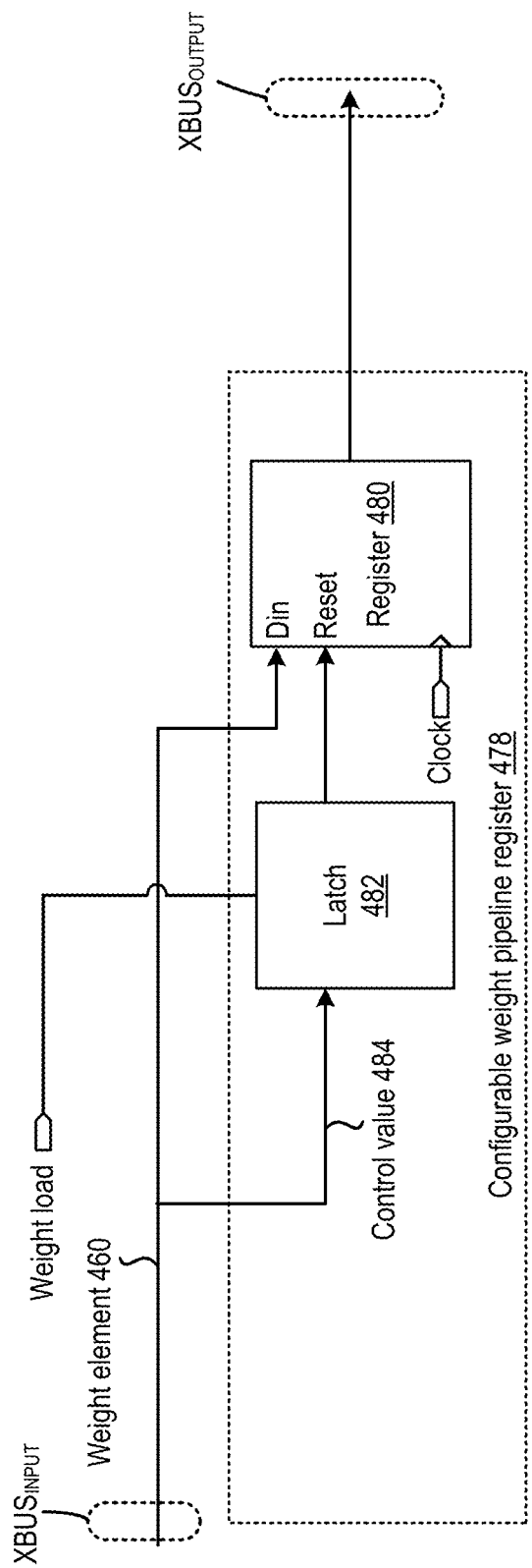

FIG. 4E illustrates another example of an internal structure of a configurable weight pipeline register 462. In some examples, configurable weight pipeline register 462 can be used in place of configurable weight pipeline register 442 in FIG. 4D. As shown in FIG. 4E, configurable weight pipeline register 462 may include a register 480 and a latch 482. Register 480 may include a flip-flop with a reset terminal, a DIN terminal, and a clock terminal. The reset terminal of register 480 may be driven by output of latch 482. Latch 482 may be coupled from $XBUS_{INPUT}$ and can receive a control value 482 from $XBUS_{INPUT}$. Latch 482 is also coupled with the weight load signal of FIG. 4B. When weight load signal is asserted, latch 482 may store control value 484 received from $XBUS_{INPUT}$, and provide the reset signal of register 482 based on control value 484. For example, latch 482 may store a control value 482 representing a logical one. Latch 482 can drive the reset terminal of register 480 at a logical one and maintain register 480 in a reset state, to prevent register 480 from propagating weight element 460 to the weight pipeline register of the next processing element. Latch 482 may also store a control value 482 representing a logical zero. Latch 482 can drive the reset terminal of register 480 at a logical zero and allow register 482 to exit the reset state, which allows register 480 to propagate weight element 460 to the weight pipeline register of the next processing element via $XBUS_{OUTPUT}$.

In some examples, configurable weight pipeline register 462 of FIG. 4E can also be used to interface with a processing element that does not include a flush value setting mechanism in the weight pipeline register (e.g., including MUX 472 controlled by the weight load signal as in configurable weight pipeline register 442 of FIG. 4C). With such arrangement, configurable weight pipeline register 462 can prevent that processing element from propagating a weight value to other processing elements (e.g., processing elements not involved in a neural network computation). In some examples, to reduce circuit complexity and weight data propagation delay, only a pre-determined number of processing elements of each row of computing engine 424 are pre-configured to include a flush value setting mechanism. The selection of which processing element(s) to include a flush value setting mechanism can be based on, for example, an expected utilization pattern of the processing elements.

For example, referring to FIG. 4B, based on a determination that the processing elements of the first two columns (e.g., PE 11, PE 12, PE 21, PE 22, etc.) are utilized most of them, the processing elements of the first two columns can be pre-configured not to have a flush value setting mechanism to reduce circuit complexity and weight data propagation delay in those processing elements, whereas the rest of the processing elements can be pre-configured to have a flush value setting mechanism that is activated upon the assertion of the weight load signal. In such an arrangement, configurable weight pipeline register 462 of FIG. 4E can be included in PE 13.

To prevent PE 12 from propagating a weight to PE 13 and to other PEs on the right side of PE 13, computation controller 430 can transmit a control value 484 including a logical one via $XBUS_{INPUT}$ to configurable weight pipeline register 462 of PE 13. Latch 482 can latch in the logical one upon receiving an asserted weight load signal to reset register 480. As the logical one is stored in latch 482, register 480 can remain in the reset state and can prevent the weight values received from PE 12 from propagating to PE 13 and to other PEs on the right side of PE 13. On the other hand, if PE 13 (and one or more PEs on the right of PE 13) are to be involved in the neural network computations, computation controller 430 can transmit a control value 484 including a logical zero to configurable weight pipeline register 462 of PE 13. Latch 482 can latch in the logical zero upon receiving an asserted weight load signal to reset register 480 to remove register 480 from the reset state, and allow register 480 to propagate weights received from PE 12 to PE 13 and to other PEs on the right side of PE 13.

Figure 5:
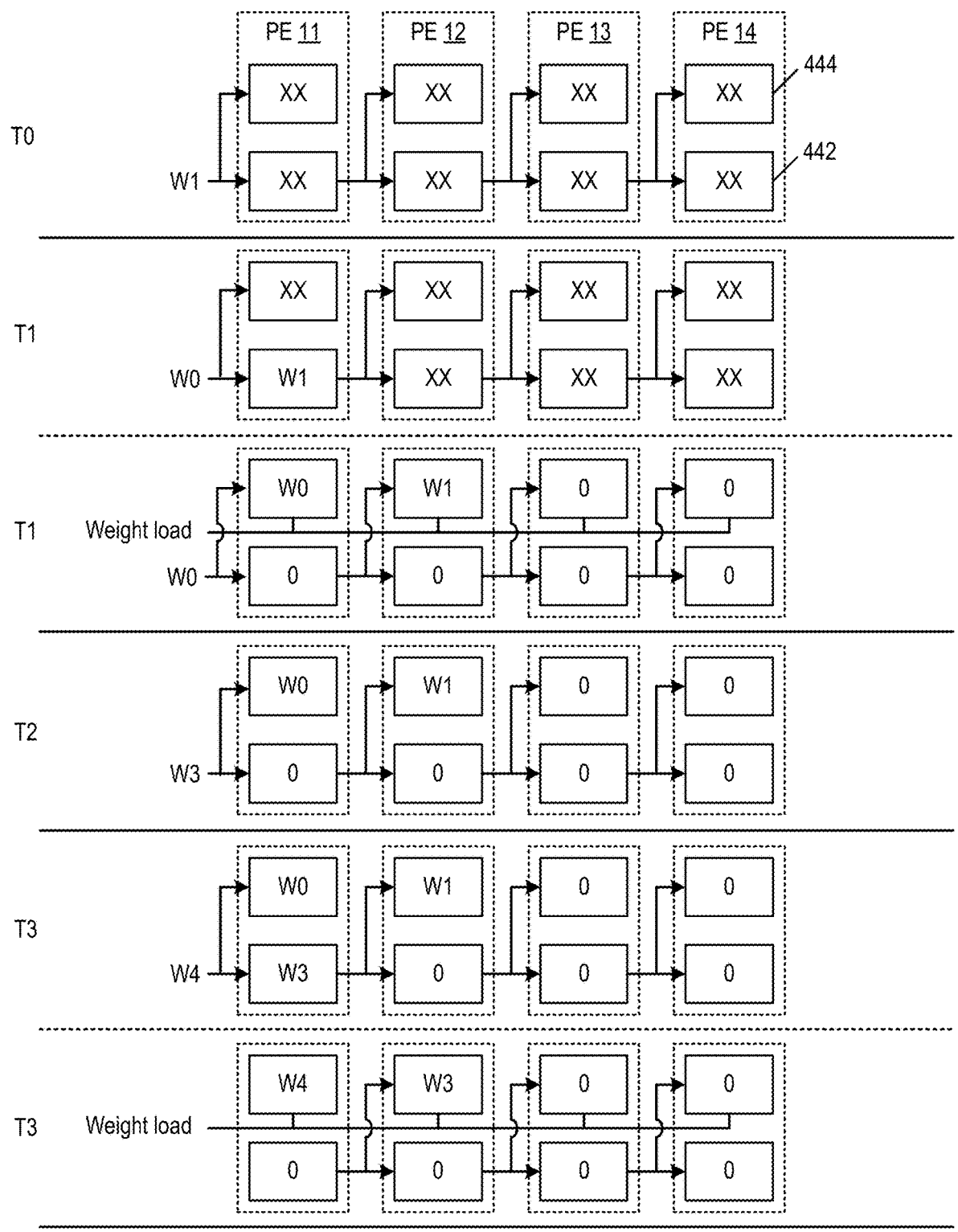
FIG. 5 is a simplified block diagram illustrating examples of weight loading operations of the apparatus of FIG. 4D.

FIG. 5 illustrates an example of a sequence of states of weight pipeline register 442 and weight load register 444 of a row of PEs during weights pre-fetching operations. At time T0, W1 may be provided at the input of weight pipeline register 442a and weight load register 444a of PE 11. Weight load may not be asserted.

At time T1, weight pipeline register 442a of PE 11 may store W1. The storing of W1 can be caused by, for example, weight pipeline register 442a receiving a first clock edge of a first clock cycle during time T1. W1 may also be provided at the input of weight pipeline register 442a and weight load register 444a.

At time T2, after the first clock edge at T1 (and after weight pipeline register 442a stores weight W1), weight load may be asserted, and weight load register 444a of PE 11 may latch in W0, whereas weight load register 444b of PE 12 may latch in W1 provided by weight pipeline register 442a of PE 11. Moreover, the assertion of weight load signal may also cause multiplexor 472 to provide a flush value (e.g., a zero value) at the inputs of weight pipeline registers 442a, 442b, 442c, and 442d. Upon each of these registers receiving a second clock edge of a second clock cycle during time T2, weight pipeline registers 442a, 442b, 442c, and 442d may store a zero, and weight load registers 444c and 444d (of PEs 13 and 14) may also latch in a zero from the output of, respectively, weight pipeline register 442b and 442c. After time T2, both PEs 11 and 12 can start arithmetic operations based on the weights stored at weight load register 444 of each PE.

At time T3, W3 may be provided at the input of weight pipeline register 442a and weight load register 444a of PE 11. At time T3, weight load registers 444a and 444b may still store, respectively, weights W0 and W1.

At time T4, weight pipeline register 442a of PE 11 may store W3 after receiving a third clock edge of a third clock cycle during time T4. W4 can be provided at the input of weight pipeline register 442a and weight load register 444a.

At time T5, after the third clock edge at T4 (and after weight pipeline register 442a stores weight W3), weight load may be asserted again, weight load register 444a of PE 11 may latch in W4, whereas weight load register 444b of PE 12 may latch in W3 provided by weight pipeline register 442a of PE 11. Moreover, the assertion of weight load signal may cause multiplexor 472 to provide a flush value (e.g., a zero value) at the inputs of weight pipeline registers 442a, 442b, 442c, and 442d. Upon each of these registers receiving a fourth clock edge of a fourth clock cycle during time T5, weight pipeline registers 442a, 442b, 442c, and 442d may store a zero, and weight load registers 444c and 444d (of PEs 13 and 14) may also latch in a zero from the output of, respectively, weight pipeline register 442b and 442c.

In the example of FIG. 5, since the weights stored in PE 11 and PE 12 are not propagated to the PEs 13 and 14, and there is no need to flush weights stored in PEs 13 and 14, pre-fetching of weights can take place in a much shorter time span. Compared with FIG. 1B where the latency between pre-fetching of two different weight sets spans between times T0-T4, in FIG. 5 the latency only spans between times T0-T2

Figure 6:
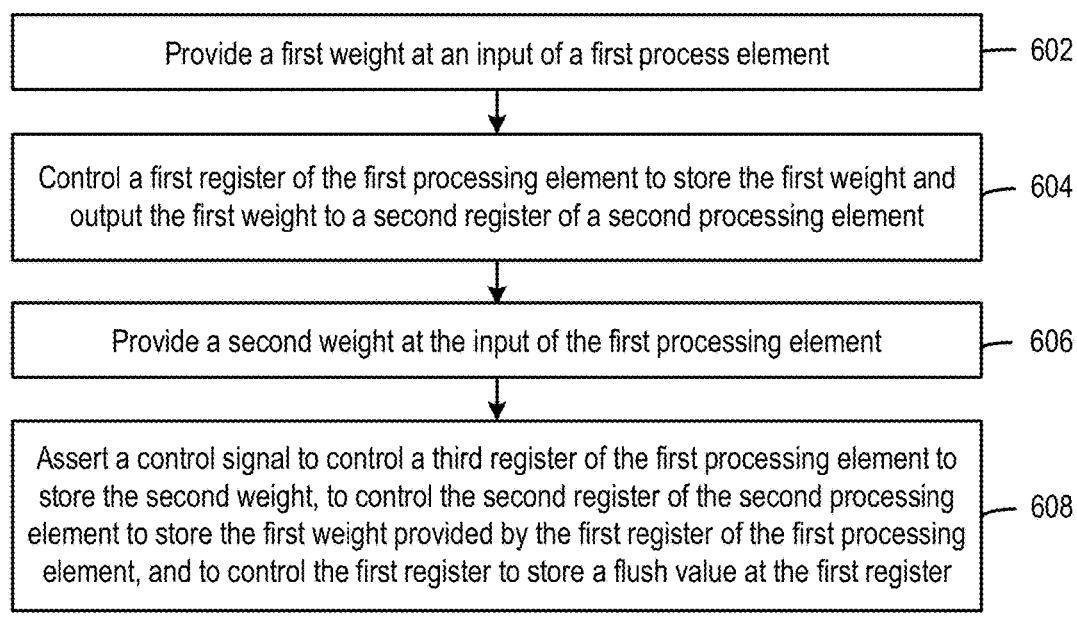
FIG. 6 illustrates an example flow diagram of performing neural network processing, according to certain aspects of the present disclosure.

FIG. 6 illustrates an example flow diagram of a process 600 for operating an array of processing elements. Process 600 may be implemented by, for example, neural network processor 402 to pre-fetch a set of weights to computing engine 424 for neural network computations. The computations may include, for example, computations for a deep neural network (DNN), a convolutional neural network (CNN), etc.

At operation 602, computation controller 430 may provide a first weight (e.g., W1) at an input of a first process element of computing engine 424 (e.g., PE 11). The first weight may be pre-fetched from state buffer 422. In some examples, operation 602 may be at, for example, time T0 of FIG. 5.

At operation 604, computation controller 430 may control a first register of the first processing element (e.g., weight pipeline register 422a) to store the first weight and output the first weight to a second register of a second processing element (e.g., weight load register 444b). The controlling can be based on, for example, supplying a clock signal to clock the first register and providing the first weight at the input of the first register such that the first register stores and outputs first weight at a clock edge of the clock signal. Operation 604 may be performed at, for example, time T1 of FIG. 5.

At operation 606, computation controller 430 may also provide a second weight (e.g., W0) at the input of the first process element. Operation 606 may also be performed at, for example, time T1 of FIG. 5.

At operation 608, computation controller 430 may assert a control signal (e.g., weight load signal) to control a third register of the first processing element (e.g., weight load register 444a) to store the second weight, to control the second register of the second processing element (e.g., weight load register 444b) to store the first weight provided by a first register of the first processing element (e.g., weight pipeline register 422a), and to control the first register to store a flush value to prevent the first register from propagating the first weight to the second processing element after the control signal is de-asserted. In some examples, operation 608 may be performed at, for example, time T2 of FIG. 5.

Figure 7:
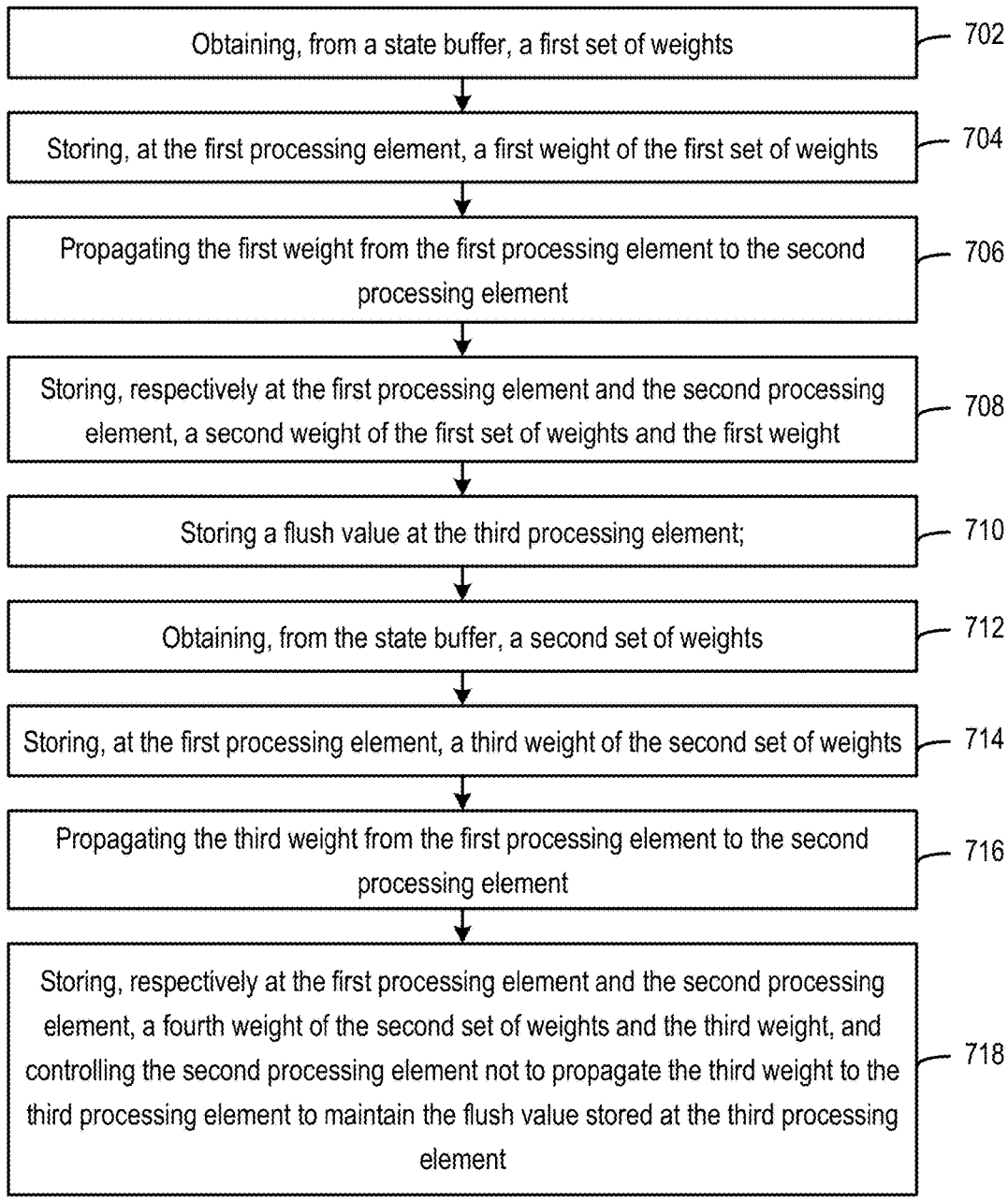
FIG. 7 illustrates another example flow diagram of performing neural network processing, according to certain aspects of the present disclosure.

FIG. 7 illustrates an example flow diagram of a process 700 for operating an array of processing elements. Process 700 may be implemented by, for example, neural network processor 402 to pre-fetch a set of weights to computing engine 424 for neural network computations. The computations may include, for example, computations for a deep neural network (DNN), a convolutional neural network (CNN), etc.

At operation 702, computation controller 430 may obtain, from state buffer 422, a first set of weights (e.g., W1 and W0). The first set of weights are to be provided to first processing element (e.g., PE 11) and a second processing element (e.g., PE 12) to perform neural network computations using the first set of weights, the row of processing elements further comprising a third processing element (e.g., PE 13) not involved in the neural network computations. The first set of weights may be provided to a row of processing elements including the first processing element and the second processing element sequentially.

At operation 704, computation controller 430 may store, at the first processing element, a first weight of the first set of weights.

At operation 706, computation controller 430 propagates, the first weight from the first processing element to the second processing element, such that the first weight becomes available at the input of the second processing element. Operations 704 and 706 may be performed at, for example, configurable weight pipeline register 442 at the first processing element.

At operation 708, computation controller 430 may store, respectively at the first processing element and the second processing element, a second weight of the first set of weights and the first weight. Operation 708 may be performed at, for example, weight load register 444 at the first processing element and at the second processing element by asserting a weight load signal. The weight load register 444 at the second processing element may latch in the first weight propagated from the configurable weight pipeline register 442 of the first processing element, whereas weight load register 444 at the first processing element may latch in the second weight provided to the row of processing elements by computation controller 430.

At operation 710, computation controller 430 may store a flush value at the weight load register 444 of the third processing element by asserting the weight load signal. In some examples, operations 708 and 710 can be performed simultaneously. The assertion of the weight load signal also causes the configurable weight pipeline register 442 of the first processing element and of the second processing element to store the flush value, such that the first weight is not propagated to the second processing element (and subsequently to the third processing element).

At operation 712, computation controller 430 may obtain, from state buffer 422, a second set of weights (e.g., W3 and W4). The second set of weights are to be provided to the first processing element and to the second processing element to perform neural network computations using the second set of weights.

At operation 714, computation controller 430 may store, at the first processing element, a third weight of the second set of weights.

At operation 716, computation controller 430 may propagate the third weight from the first processing element to the second processing element, such that the third weight becomes available at the input of the second processing element. Operations 714 and 716 may be performed at, for example, configurable weight pipeline register 442 at the first processing element. Meanwhile, the configurable weight pipeline register 442 of the second processing element propagates the flush value (instead of the first value) to the third processing element, due to the storing of the flush value at the configurable weight pipeline register 442 of the second processing element at operation 710.

At operation 718, computation controller 430 may store, respectively at the first processing element and the second processing element, a fourth weight of the second set of weights and the third weight. Operation 718 may be performed at, for example, weight load register 444 at the first processing element and at the second processing element by asserting a weight load signal. The weight load register 444 at the second processing element may latch in the third weight propagated from the configurable weight pipeline register 442 of the first processing element, whereas the weight load register 444 at the first processing element may latch in the fourth weight provided to the row of processing elements by computation controller 430. The assertion of the weight load signal also causes the third processing element to store the flush value propagated by the second processing element (at operation 716). Moreover, as part of operation 718, computation controller 430 may also control the second processing element not to propagate the third weight to the third processing element to maintain the flush value stored at the third processing element. For example, when the weight load signal is asserted, the configurable weight pipeline register 442 of the second processing element can store the flush value instead of the third weight from the first processing element. With such arrangement, the configurable weight pipeline register 442 of the second processing element can be prevented from propagating a weight value to the weight load register 444 of the third processing element, and the weight load register 444 of the third processing element can maintain the flush value.

Figure 8:
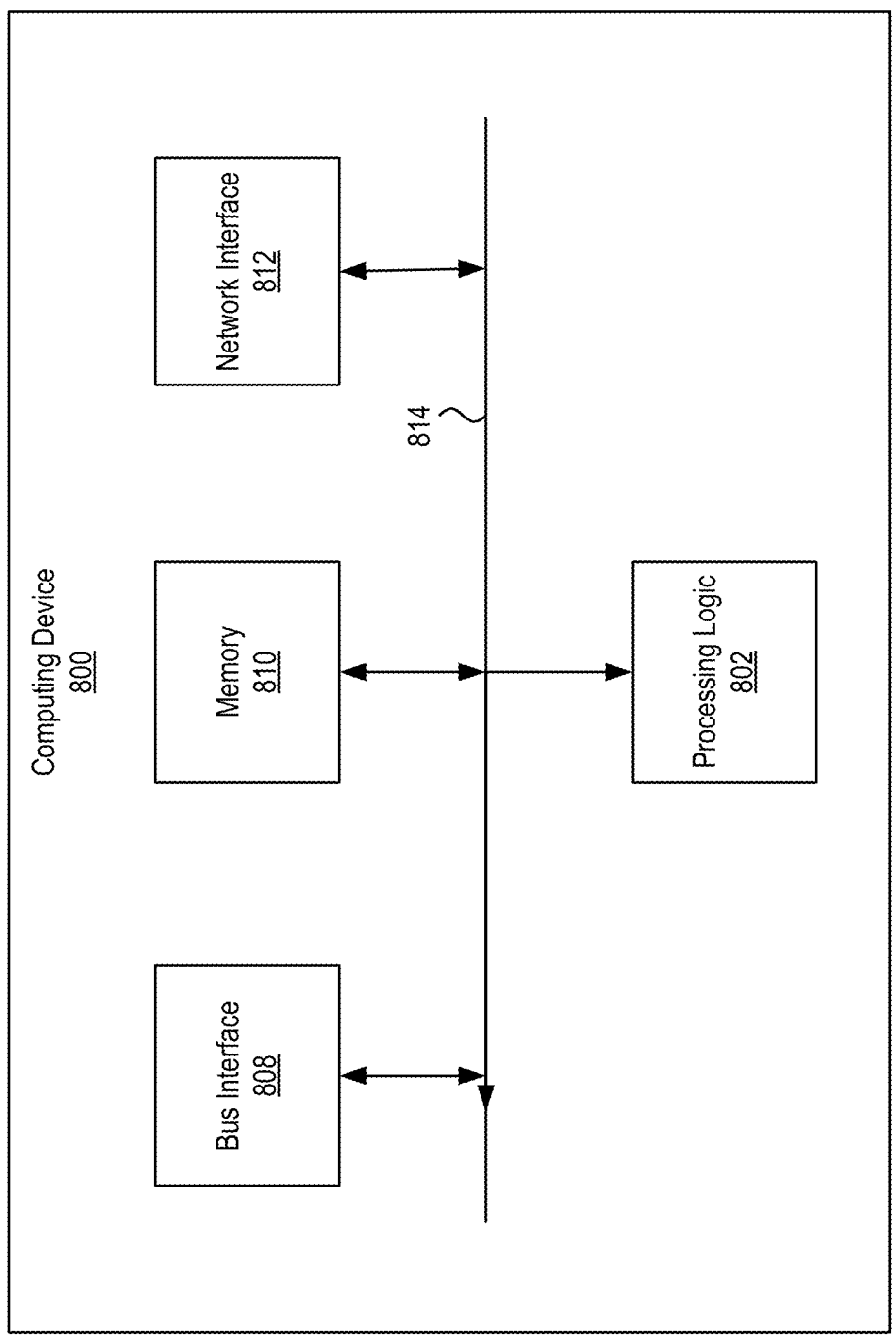
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 800 (e.g., the hardware and software resources associated with provision of an image recognition service) can be allocated to a client upon request.

In one example, the computing device 800 may include processing logic 802, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, not illustrated here. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810. Processing logic 802 may also include hardware circuities for performing artificial neural network computation including, for example, neural network processor 402, etc.

The access to processing logic 802 can be granted to a client to provide the personal assistant service requested by the client. For example, computing device 800 may host a virtual machine, on which an image recognition software application can be executed. The image recognition software application, upon execution, may access processing logic 802 to predict, for example, an object included in an image. As another example, access to processing logic 802 can also be granted as part of bare-metal instance, in which an image recognition software application executing on a client device (e.g., a remote computer, a smart phone, etc.) can directly access processing logic 802 to perform the recognition of an image.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory 810 may also store, for example, software applications for performing artificial neural network computation. For example, memory 810 may store software routines related to the computations of the equations above. In a case where processing logic 802 is in the form of FPGA, memory 810 may store netlists data representing various logic circuit components of processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 800 may include a network interface module for communicating with a wired Ethernet network, a wireless 802.11 network, a cellular network, an Infiniband network, etc. In some embodiments, computing device 800 may receive a set of parameters, such as the aforementioned weight vectors for generation of forget gate factor, input factor, output factor, etc. from a server through network interface module 812.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   obtaining, from a state buffer of a neural network processor, a first set of weights for neural network computations, the neural network processor comprising a row of processing elements, the row of processing elements comprising first, second, and third processing elements, the third processing element being not involved in the neural network computations;
   storing, at the first processing element, a first weight of the first set of weights;
   propagating the first weight from the first processing element to the second processing element;
   storing a second weight of the first set of weights at the first processing element;
   obtaining, from the state buffer, a second set of weights for neural network computations;
   storing, at the first processing element, a third weight of the second set of weights;
   propagating the third weight from the first processing element to the second processing element;
   storing a fourth weight of the second set of weights at the first processing element; and
   propagating a flush value from the second processing element to the third processing element instead of propagating the first or second weights to the third processing element.

2. The method of claim 1, wherein each of the first processing element, the second processing element, and the third processing element includes a pipeline register and a load register, the pipeline register being controllable to select, based on a weight load signal, between the flush value and a weight value for storage at the pipeline register, and the load register being controllable based on the weight load signal to store a weight value;
   wherein the method further comprises:
      de-asserting the weight load signal to control the pipeline register of the first processing element to store the first weight and to propagate the first weight to the load register of the second processing element;
      asserting the weight load signal to:
         store a flush value at the pipline registers of the first processing element, the second processing element, and the third processing element,
         store the second weight at the load register of the first processing element;
         store the first weight at the load register of the second processing element; and
         store the flush value at the load register of the third processing element.

3. The method of claim 2, wherein the method further comprises:
   de-asserting the weight load signal to control the pipeline register of the first processing element to store the third weight and to propagate the third weight to the load register of the second processing element;
   asserting the weight load signal to:
      store the fourth weight at the load register of the first processing element;
      store the third weight at the load register of the second processing element; and
      maintain the flush value at the load register of the third processing element.

4. An integrated circuit comprising:
   memory configured to store a first weight and a second weight; and
   a row of processing elements comprising a first processing element and a second processing element;
   a controller configured to:
      obtain the first weight from the memory;
      provide the first weight to the row of processing elements;
      propagate the first weight through at least a part of the row of processing elements to reach the first processing element;
      store the first weight at a first weight register of the first processing element and a flush value at a second weight register of the second processing element;
      obtain the second weight from the memory;
      provide the second weight to the row of processing elements;
      propagate the second weight through the at least a part of the row of processing elements to reach the first processing element;
      propagate the flush value through at least a part of the row of processing elements; and
      store the second weight at the first weight register and the flush value at the second weight register.

5. The integrated circuit of claim 4, wherein each processing element of the row of processing elements includes a weight register and pipeline register;
   wherein the pipeline register is controllable to store one of a weight value or the flush value based on a weight load signal;
   wherein the weight register is controllable to store a value at an input based on the weight load signal;
   wherein an input of the weight register of the first processing element and an input of the pipeline register of the first processing element are coupled with an output of the pipeline register of another weight register;
   wherein an input of the weight register of the second processing element and an input of the pipeline register of the second processing element are coupled with an output of the pipeline register of the first processing element;
   wherein each pipeline register includes a multiplexer circuit controllable by the weight load signal to provide one of the flush value or the weight value to the each pipeline register for storage;

wherein, when the weight load signal is set to the first weight, the pipeline registers are controlled to store and propagate the weight value; and wherein, when the weight load signal is set to the second weight:

the pipeline registers are controlled to store and propagate the flush value, the weight register of the first processing element is controlled to store the first weight, and the weight register of the second processing element is controlled to store the flush value propagated by the pipeline register of the first processing element.

6. An apparatus, comprising:

a controller; and a first processing element and a second processing element of a row of a systolic array;

wherein the first processing element includes:

a first register configured to select, based on a control signal from the controller, between a weight value received from the controller and a flush value so as to cause either the weight value or the flush value to be propagated from the first processing element to the second processing element;

a second register configured to store the weight value based on the control signal; and arithmetic circuit configured to perform arithmetic operations for a neural network based on the weight value provided from the second register.

7. The apparatus of claim 6, wherein the controller is configured to set the control signal to a first value to control the second register to store the weight value and to control the first register to propagate the flush value to the second processing element.

8. The apparatus of claim 7, wherein the second processing element further comprises a third register configured to store the weight value or the flush value propagated from the first register based on the control signal;

wherein the controller is configured to:

at a first clock cycle, responsive to the control signal being set to the first value:

store the weight value at the second register; and store the flush value at the third register of the second processing element; and at a second clock cycle, responsive to the control signal being set to a second value:

maintain the weight value at the second register; and maintain the flush value at the third register of the second processing element.

9. The apparatus of claim 8, wherein the weight value is a first weight value;

wherein the controller is configured to:

at a third clock cycle, responsive to the control signal being set to the second value:

store a second weight value at the first register; and maintain the flush value at the third register of the second processing element.

10. The apparatus of claim 9, wherein the controller is further configured to maintain the first weight value at the second register at the third clock cycle.

11. The apparatus of claim 6, wherein the second register comprises a storage circuit controllable with an enable signal;

wherein the storage circuit is configured to store the weight value based on a state of the enable signal; and wherein the state of the enable signal is set by the control signal.

12. The apparatus of claim 11, wherein the storage circuit comprises a latch or a flip-flop.

13. The apparatus of claim 6, wherein the first register comprises a flip-flop.

14. The apparatus of claim 13, wherein the first register further comprises a multiplexer configured to select using the control signal between the flush value and the weight value as an input to the flip-flop.

15. The apparatus of claim 13, wherein the flip-flop is controllable by a reset signal to reset a value stored at the flip-flop to the flush value;

wherein the reset signal is provided by the control signal.

16. The apparatus of claim 13, wherein the flush value comprises a zero value or a pre-determined value.

17. The apparatus of claim 6, wherein the second processing element comprises arithmetic circuitry configured to:

receive the weight value or the flush value from a third register; and perform the arithmetic operations for the neural network based on the weight value or the flush value.

18. A method, comprising:

controlling a first processing element to propagate a first weight to a second processing element;

providing a second weight at an input of the first processing element; and asserting a control signal to store the second weight at the first processing element, to store the first weight at the second processing element, to stop the first processing element from propagating the second weight to the second processing element, and to cause the first processing element to propagate a flush value to the second processing element.

19. The method of claim 18, wherein:

the first processing element is controlled to propagate the first weight to the second processing element in a first clock cycle; and the control signal is asserted in a second clock cycle immediately after the first clock cycle to store the second weight at the first processing element, the first weight at the second processing element, and the flush value at the third processing element in the second clock cycle.

20. The method of claim 18, further comprising asserting the control signal to stop the second processing element from propagating the first weight to a third processing element.

* * * * *